United States Patent
Meyer et al.

(10) Patent No.: US 9,970,614 B2
(45) Date of Patent: May 15, 2018

(54) INSULATED GLAZING UNITS AND MICROOPTICAL LAYER COMPRISING MICROSTRUCTURED DIFFUSER AND METHODS

(71) Applicant: 3M INNOVATIVE PROPERTIES COMPANY, St. Paul, MN (US)

(72) Inventors: Justin P. Meyer, Oakdale, MN (US); Martin B. Wolk, Woodbury, MN (US); Thomas R. Hoffend, Jr., Pleasanton, CA (US); Steven J. McMan, Stillwater, MN (US); Daniel W. Hennen, Cottage Grove, MN (US); Evan L. Schwartz, Vadnais Heights, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days. days.

(21) Appl. No.: 15/519,945

(22) PCT Filed: Oct. 6, 2015

(86) PCT No.: PCT/US2015/054114
§ 371 (c)(1),
(2) Date: Apr. 18, 2017

(87) PCT Pub. No.: WO2016/064565
PCT Pub. Date: Apr. 28, 2016

(65) Prior Publication Data
US 2017/0335620 A1  Nov. 23, 2017

Related U.S. Application Data

(60) Provisional application No. 62/066,130, filed on Oct. 20, 2014.

(51) Int. Cl.
*F21S 11/00* (2006.01)
*E06B 3/67* (2006.01)
(Continued)

(52) U.S. Cl.
CPC .............. *F21S 11/007* (2013.01); *B32B 7/02* (2013.01); *B32B 7/06* (2013.01); *B32B 7/12* (2013.01);
(Continued)

(58) Field of Classification Search
CPC ...................................... F21S 11/007
See application file for complete search history.

(56) References Cited

U.S. PATENT DOCUMENTS 4,472,480 A   9/1984  Olson
4,567,073 A   1/1986  Larson et al.
(Continued)

FOREIGN PATENT DOCUMENTS

CN   103728686    4/2014
WO   WO 00/48037  8/2000
(Continued)

OTHER PUBLICATIONS

Bub, "Controlled Angular Redirection of Light via Nanoimprinted Disordered Gratings," Applied Optics, 2013, vol. 52, No. 04, pp. 709-716.
(Continued)

*Primary Examiner* — Christopher Mahoney

(57) ABSTRACT

Transfer tapes and methods of making transfer tapes are described. In one aspect, the transfer tape comprises a template layer having a structured surface; a backfill layer disposed on at least a portion of the template layer, the backfill layer having a microstructured surface opposite the structured surface; and a layer disposed adjacent the microstructured surface, wherein the layer disposed adjacent the microstructured surface has a refractive index that differs from the backfill layer. The microstructured surface together with the adjacent layer functions as a diffusive layer, or in other words a diffusive interface. Also described are
(Continued)

microoptical glazing and methods of making microoptical glazing as well as insulated glazing units and methods of making insulated glazing units.

25 Claims, 10 Drawing Sheets

(51) Int. Cl.
| | | |
|---|---|---|
| *B32B 7/02* | (2006.01) | |
| *B32B 7/06* | (2006.01) | |
| *B32B 7/12* | (2006.01) | |
| *B32B 27/28* | (2006.01) | |
| *B32B 27/34* | (2006.01) | |
| *E06B 9/24* | (2006.01) | |
| *G02B 5/02* | (2006.01) | |

(52) U.S. Cl.
CPC ............ *B32B 27/283* (2013.01); *B32B 27/34* (2013.01); *E06B 3/6715* (2013.01); *E06B 9/24* (2013.01); *G02B 5/0231* (2013.01); *G02B 5/0278* (2013.01); *B32B 2307/304* (2013.01); *B32B 2307/412* (2013.01); *B32B 2307/418* (2013.01); *B32B 2307/538* (2013.01); *B32B 2551/00* (2013.01); *E06B 2009/2417* (2013.01)

(56) References Cited

U.S. PATENT DOCUMENTS

| | | |
|---|---|---|
| 4,614,667 A | 9/1986 | Larson et al. |
| 5,175,030 A | 12/1992 | Lu et al. |
| 5,183,597 A | 2/1993 | Lu |
| 5,491,015 A | 2/1996 | Reeves et al. |
| 5,691,846 A | 11/1997 | Benson, Jr. et al. |
| 6,329,058 B1 | 12/2001 | Arney et al. |
| 6,366,013 B1 | 4/2002 | Leenders et al. |
| 6,521,324 B1 | 2/2003 | Debe et al. |
| 6,858,253 B2 | 2/2005 | Williams et al. |
| 7,328,638 B2 | 2/2008 | Gardiner et al. |
| 7,350,442 B2 | 4/2008 | Ehnes et al. |
| 7,384,809 B2 | 6/2008 | Donofrio |
| 7,947,376 B2 | 5/2011 | Sherman et al. |
| 8,241,732 B2 | 8/2012 | Hansen et al. |
| 8,377,540 B2 | 2/2013 | Chiu et al. |
| 8,765,881 B2 | 7/2014 | Hays et al. |
| 9,472,788 B2 | 10/2016 | Collier et al. |
| 2003/0219992 A1 | 11/2003 | Schaper |
| 2004/0118510 A1 | 6/2004 | Pollock et al. |
| 2005/0118352 A1 | 6/2005 | Suwa |
| 2006/0270806 A1 | 11/2006 | Hale |
| 2007/0042174 A1 | 2/2007 | Rao et al. |
| 2008/0291541 A1 | 11/2008 | Padiyath et al. |
| 2009/0015142 A1 | 1/2009 | Potts et al. |
| 2009/0098739 A1 | 4/2009 | Ohnuma et al. |
| 2009/0256287 A1 | 10/2009 | Fu et al. |
| 2009/0322219 A1 | 12/2009 | Wolk et al. |
| 2010/0006211 A1 | 1/2010 | Wolk et al. |
| 2010/0104807 A1 | 4/2010 | Chiu et al. |
| 2010/0151207 A1 | 6/2010 | Hansen et al. |
| 2010/0160577 A1 | 6/2010 | Hirano |
| 2011/0091694 A1 | 4/2011 | Hiyashi et al. |
| 2011/0182805 A1 | 7/2011 | DeSimone et al. |
| 2011/0241051 A1 | 10/2011 | Carter et al. |
| 2011/0278772 A1 | 11/2011 | Inamiya et al. |
| 2011/0280004 A1 | 11/2011 | Shimada et al. |
| 2011/0305787 A1 | 12/2011 | Ishii et al. |
| 2012/0099323 A1 | 4/2012 | Thompson |
| 2012/0327507 A1 | 12/2012 | Padiyath et al. |
| 2013/0011608 A1 | 1/2013 | Wolk et al. |
| 2013/0038928 A1 | 2/2013 | Padiyath et al. |
| 2013/0319522 A1 | 12/2013 | Koike et al. |
| 2014/0021492 A1 | 1/2014 | Wolk et al. |
| 2014/0104689 A1 | 4/2014 | Padiyath et al. |
| 2014/0175707 A1 | 6/2014 | Wolk et al. |
| 2014/0178646 A1 | 6/2014 | Wolk et al. |
| 2014/0242343 A1 | 8/2014 | Free et al. |
| 2015/0079363 A1 | 3/2015 | Free et al. |
| 2015/0202834 A1 | 7/2015 | Free et al. |
| 2015/0207107 A1 | 7/2015 | Schwartz et al. |
| 2016/0096316 A1 | 4/2016 | Wolk et al. |
| 2016/0104851 A1 | 4/2016 | Wolk et al. |
| 2016/0333634 A1 | 11/2016 | Free et al. |
| 2016/0333635 A1* | 11/2016 | Free .................. B32B 7/06 |
| 2017/0012247 A1 | 1/2017 | Collier et al. |

FOREIGN PATENT DOCUMENTS

| | | |
|---|---|---|
| WO | WO 2008/118610 | 10/2008 |
| WO | WO 2011/088161 | 7/2011 |
| WO | WO 2012/077738 | 6/2012 |
| WO | WO 2012/082536 | 6/2012 |
| WO | WO 2012/134787 | 10/2012 |
| WO | WO 2013/012858 | 1/2013 |
| WO | WO 2013/012865 | 1/2013 |
| WO | WO 2013/078278 | 5/2013 |
| WO | WO 2013/158475 | 10/2013 |
| WO | WO 2014/014595 | 1/2014 |
| WO | WO 2014/081693 | 5/2014 |
| WO | WO 2014/093119 | 6/2014 |
| WO | WO 2014/194154 | 12/2014 |
| WO | WO 2015/050750 | 4/2015 |
| WO | WO 2015/108773 | 7/2015 |
| WO | WO 2015/112708 | 7/2015 |
| WO | WO 2015/112711 | 7/2015 |
| WO | WO 2016/064565 | 4/2016 |
| WO | WO 2016/064595 | 4/2016 |
| WO | WO 2016/064667 | 4/2016 |

OTHER PUBLICATIONS

Hocheng, "Microstructural fabrication and design of sunlight guide panels of inorganic-organic hybrid material," Energy and Buildings, 2011, vol. 43, pp. 1011-1019.

Ludman, "Holographic Daylighting," SPIE, Application and Theory of Periodic Structures, 1995, vol. 2532, pp. 436-446.

Reed, "Polynomial Codes Over Certain Finite Fields," Journal for the Society for Industrial and Applied Mathematics, 1960, vol. 08, No. 02, pp. 300-304.

Shaw, "Negative Photoresists for Optical Lithography," IBM Journal of Research and Development, 1997, vol. 41, pp. 81-94.

International Search Report for PCT International Application No. PCT/US2015/054114, dated Dec. 1, 2015, 4 pages.

* cited by examiner

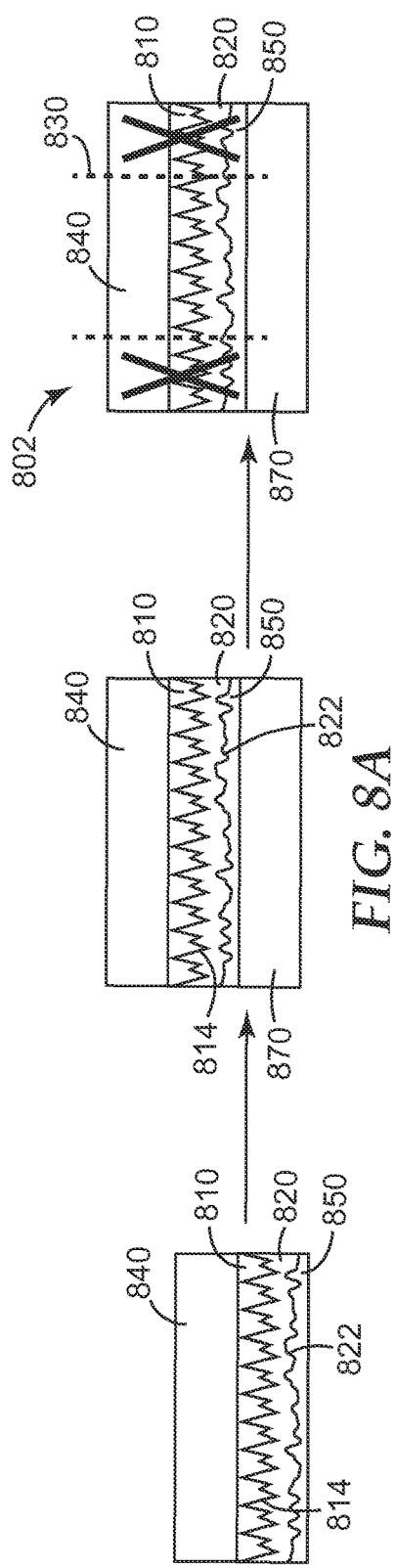
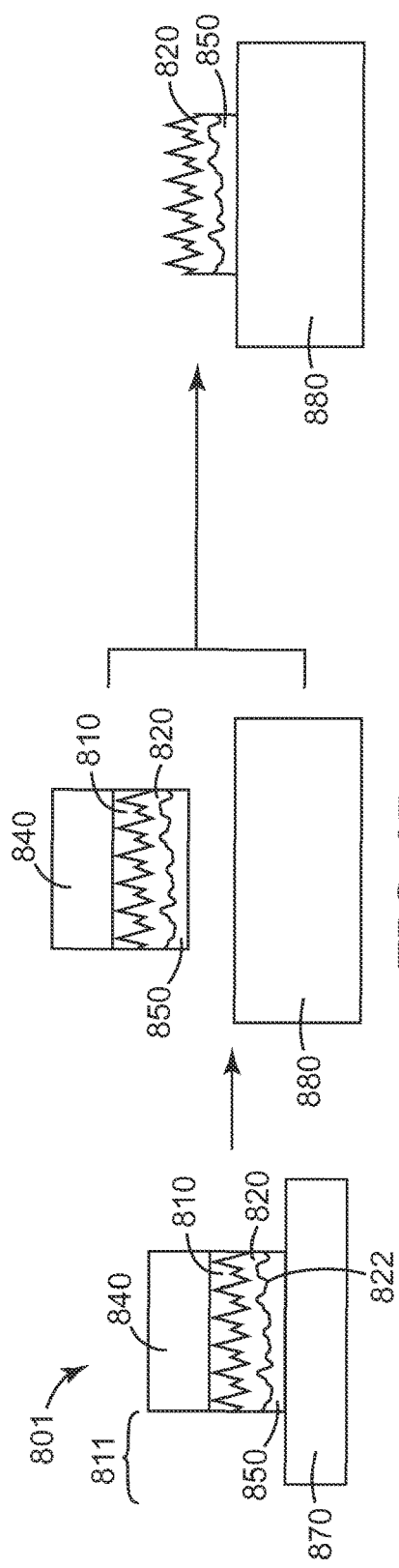
FIG. 8A
FIG. 8B

INSULATED GLAZING UNITS AND MICROOPTICAL LAYER COMPRISING MICROSTRUCTURED DIFFUSER AND METHODS

CROSS REFERENCE TO RELATED APPLICATIONS

This application is a national stage filing under 35 U.S.C. 371 of PCT/US2015/054114, filed Oct. 6, 2015, which claims the benefit of US Provisional Application No. 62/066130, filed Oct. 20, 2014, the disclosure of which is incorporated by reference in its/their entirety herein.

BACKGROUND

Insulated Glazing Units (IGUs) are used to reduce thermal loss through architectural exterior wall windows. A typical IGU includes two panes, a spacer frame, and a cavity formed by these three elements. Microoptical elements integrated into an IGU can be used to redirect some of the sunlight passing through the IGU to an interior ceiling, to augment conventional interior lighting, thereby increasing the energy efficiency of buildings. In many cases, it can be convenient to integrate the microoptical elements directly on the glass of the window, e.g., by applying refractive or diffractive optical structures to the surface of the glass such as within the cavity of an IGU such as described in US2014/0021492 and US2014/0178646; incorporated herein by reference.

SUMMARY

Daylight redirecting microoptics redirects most of the sunlight upwards. However, a fraction of the light can go downwards, causing glare. Particularly when the (e.g. prismatic) structures are linear and oriented horizontally, the incoming rays are refracted/reflected mainly in the vertical direction. Sunlight is highly collimated with about a 0.5 degree spread and appears as a solar disk. The effect of the daylight redirecting film is to spread this light vertically forming what is referred to as a "solar column".

Both the total fraction of downward directed light and brightness of the solar column contribute to glare. The use of a microstructured diffuser layer, as described herein, reduces glare by diminishing the visibility of the solar column, while still redirecting at least 80% of the light upwards for input angles ranging from 30 to 60 degrees.

In some embodiments, transfer tapes and methods of making transfer tapes are described.

In one aspect, the transfer tape comprises a template layer having a structured surface; a backfill layer disposed on at least a portion of the template layer, the backfill layer having a microstructured surface opposite the structured surface; and a layer disposed adjacent the microstructured surface, wherein the layer disposed adjacent the microstructured surface has a refractive index that differs from the backfill layer. The microstructured surface together with the adjacent layer functions as a diffusive layer, or in other words a diffusive interface.

In another aspect, the layer adjacent the microstructured surface is an adhesive and the adhesive is capable of bonding the back fill layer (or microoptical layer) to a major surface of the pane of glass. In another embodiment, the layer adjacent the microstructured surface is not an adhesive. In this embodiment, an adhesive layer is provided on the outer surface of the transfer tape that is capable of bonding the back fill layer (or microoptical layer) to a major surface of the pane of glass. In this later embodiment, one or more optional additional layers can be present between the layer adjacent the microstructured surface and the outer adhesive layer.

In another aspect, the backfill layer is disposed in a pattern on the template layer and/or the adjacent (e.g. adhesive) layer is disposed in a pattern on the microstructured surface of the backfill layer. In yet other embodiments, the transfer tape can comprise scoring such that only the scored portions transfer thereby forming a pattern on the receptor substrate (e.g. glass). Methods of making and using scored transfer tape are also described.

In some embodiments, microoptical glazing and methods of making microoptical glazing are described.

In one aspect, the microoptical glazing comprises a pane of glass having a major surface; a microoptical layer bonded to at least a portion of the major surface, the microoptical layer comprising a cured backfill layer having a microstructured surface, wherein the microstructured surface is adjacent a layer having a refractive index that differs from the backfill layer.

In another aspect, a microoptical glazing is described comprising a pane of glass having a major surface; a microoptical layer bonded to at least a portion of the major surface, and a microstructured interface adjacent a layer having a different refractive index. For an input angle ranging from 30° to 60° the microoptical glazing redirects upwards at least 80% of daylight and does not exhibit a solar column.

In yet other embodiments, insulated glazing units and methods of making insulated glazing units are described.

In one aspect, the insulated glazing unit comprises a pane of glass having a sun-facing pane exterior surface separated by a gap from a pane of glass having a room-facing exterior surface, each pane having an interior surface adjacent the gap. The insulated glazing unit comprises a microoptical layer disposed on an interior surface of the insulated glazing unit and a microstructured interface disposed between the microoptical layer and the room-facing exterior surface.

BRIEF DESCRIPTION OF THE DRAWINGS

FIG. 8A is a schematic process flow diagram of forming a scored transfer film;

FIG. 8B is a schematic process flow diagram of forming patterned microoptical glazing;

The figures are not necessarily to scale. Like numbers used in the figures refer to like components.

DETAILED DESCRIPTION

Figure 1A:
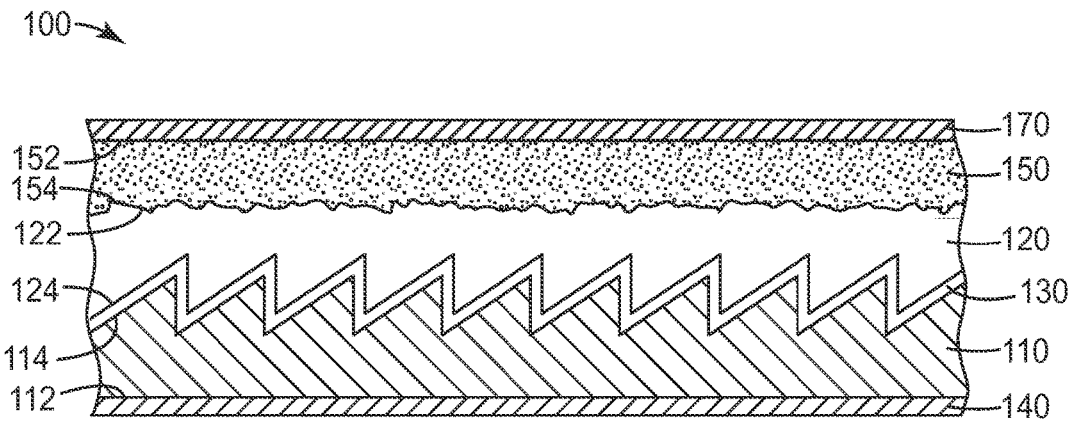
FIG. 1A-1C show a schematic cross-sectional views of a transfer tapes.

FIG. 1A shows a schematic cross-sectional view of an embodied transfer tape 100. Transfer tape 100 includes a template layer 110 having a structured surface 114 and a backfill layer 120 disposed on at least a portion of the template layer 110. The template layer 110 is typically capable of being removed from the backfill layer 120. The backfill layer 120 comprises a microstructured surface 122 opposite structured surface 114. The backfill layer 120 includes a major (transfer structured) surface 124 disposed adjacent to, conforming with structured surface 114. In other words, transfer structured surface 124 of the backfill layer is generally a negative replication of structure surface 114 of the template layer. In many embodiments described herein, the transfer tape 100 further includes a layer 150 disposed adjacent microstructured surface 122 having a refractive index that differs from backfill layer 120. In typical embodiments, the difference in refractive index between the backfill layer and (e.g. adhesive) layer adjacent the microstructured layer is at least 0.05 or 0.10. The microstructured surface together with the adjacent layer functions as a diffusive layer. In typical embodiments, layer 150 is an adhesive capable of adhering to a receptor substrate, such as glass surface. In some embodiments, the layer disposed on the microstructured layer is an optical adhesive layer. The (e.g. adhesive) layer 150 may be disposed as a continuous layer on the microstructured surface. Alternatively, the adhesive layer may be patterned as described in US2014/017646 and depicted for example in FIGS. 1B and 2D.

Transfer tape 100 can include an optional carrier film 140 disposed on a planar surface 112 of the template layer 110, opposite the structured surface 114. The optional carrier film 140 can be useful for supporting the template layer 110 during transport and subsequent fabrication steps, and in some cases can be used during the fabrication of the template layer 110. In some cases, the optional carrier film 140 can be bonded to the template layer 110 such that the two layers are not easily separated. The transfer tape 100 can still further include an optional release liner 170 disposed opposite the optional carrier film 140 and sandwiching the other layers, particularly (e.g. adhesive) layer 150 of the transfer tape 100 therebetween.

In one particular embodiment, an optional transfer layer 130 can be disposed on and conforming to the template structured surface 114 of the template layer 110, such that the optional transfer layer 130 facilitates the separation of structured surface 114 from the transfer structured surface 124. The optional transfer layer 130 can comprise a transfer release coating.

Figure 1B:
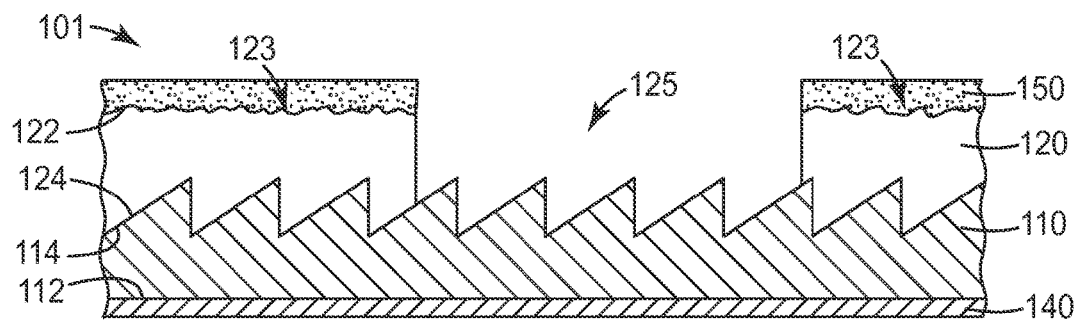

FIG. 1B shows a schematic cross-sectional view of a transfer tape 101. Each of the elements shown in FIG. 1B correspond to like-numbered elements shown in FIG. 1A, which have been described previously. The backfill layer 120 is disposed in a pattern on the template layer 110, such that a first portion 123 of the transfer tape 101 having a backfill layer 120 is positioned adjacent to a second portion 125 that lacks a backfill layer 120. The pattern formed by the first and second portions 123, 125, of the transfer tape 101 can comprise a plurality of islands, lines, or a combination of islands and lines that extend over the surface of the transfer tape 101, and can further comprise a gradient in areal density from one end of the transfer tape 101 to an opposing end, as subsequently described.

Figure 1C:
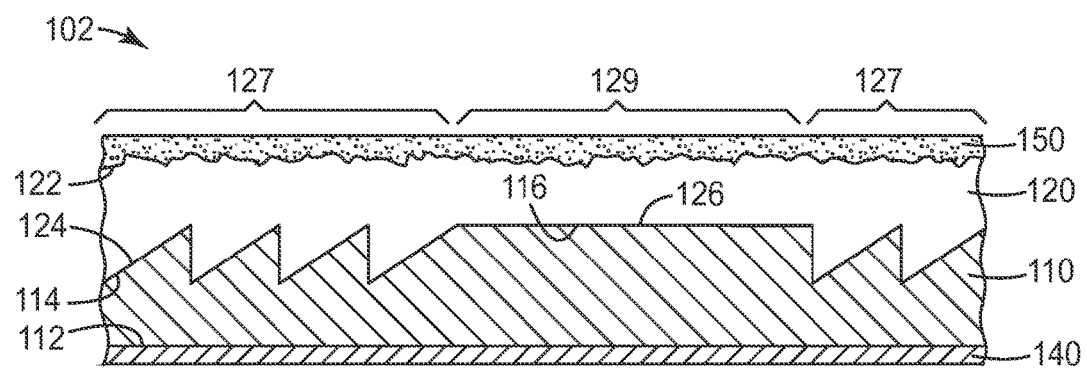

FIG. 1C shows a schematic cross-sectional view of a transfer tape 102. Each of the elements shown in FIG. 1C correspond to like-numbered elements shown in FIG. 1A, which have been described previously. In FIG. 1C, transfer tape 102 includes a template layer 110 having a structured surface 114 including planar regions 116, and a backfill layer 120 including a transfer structured surface 124 including transfer planar regions 126 disposed adjacent to, and following the contours of, the structured surface 114 with planar regions 116 of template layer 110, respectively. The transfer tape 102 includes a first portion 127 having structured surface 114, 124, and an adjacent second portions 129 having planar regions 116, 126, that are disposed in a pattern. The pattern formed by the first and second portions 127, 129, of the transfer tape 102 can comprise a plurality of islands, lines, or a combination of islands and lines that extend over the surface of the transfer tape 102, and can further comprise a gradient in areal density from one end of the transfer tape 102 to an opposing end. The patterned backfill layer of FIGS. 1B and 1C comprise microstructure surface 122 and adjacent (e.g. adhesive) layer 150 that function as a diffusive layer. The patterned backfill layer may optionally further comprise a transfer layer disposed on and conforming to the template structured surface 114 of the template layer 110 and/or optional release liner 170.

FIGS. 2A-2D show schematic cross-sectional views of microoptical glazing.

Figure 2A:
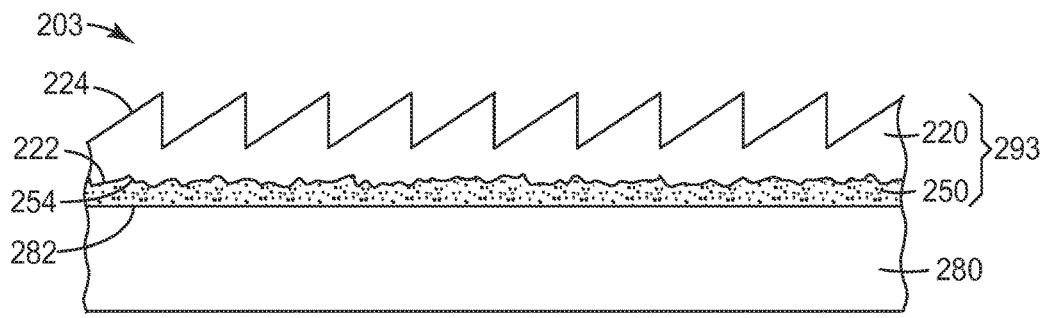
FIGS. 2A-2D show schematic cross-sectional views of a microoptical glazing.

In FIG. 2A, microoptical glazing 203 includes a receptor substrate 280 such as a pane of glass having a major surface 282, and a microoptical layer 293 bonded to at least a portion of the major surface 282. The microoptical layer 293 comprises a cured backfill layer 220 having a microstructured surface 222 and an opposing structured surface 224, and a cured (e.g. adhesive) layer 250 having a surface 254 adjacent microstructured surface 222, the cured (e.g. adhesive) layer 250 being immediately adjacent major surface 282. Cured (e.g. adhesive) layer 250 has a different refractive index than cured backfill layer 220. Typically, cured (e.g. adhesive) layer 250 has a lower refractive index than cured backfill layer 220. Further, (e.g. adhesive) layer 250 is generally index matched to receptor substrate 280 (e.g. glass). By "index matched" it is meant that the difference in refractive index is less than 0.05, 0.04, 0.03, 0.02, 0.01 or 0.001. The structured surface 224 is adjacent a low index material (such as air) having an index of refraction lower than the cured backfill layer 220.

Figure 2B:
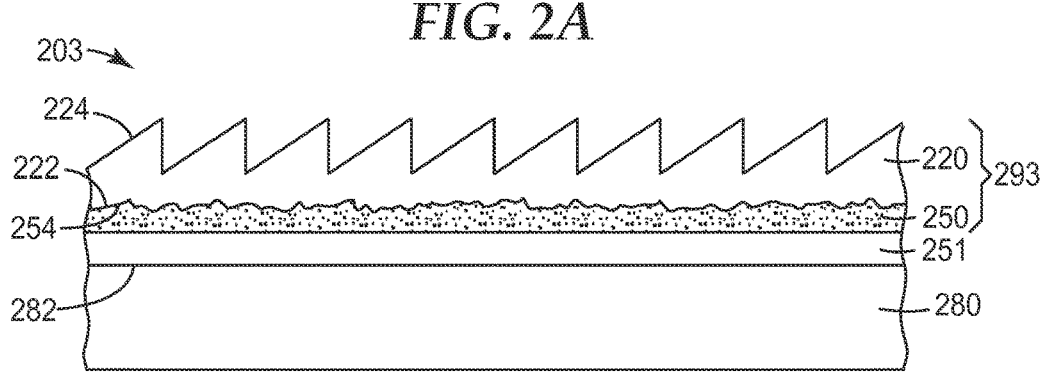

In FIG. 2B, microoptical glazing 203 includes a receptor substrate 280 such as a pane of glass having a major surface 282, and a microoptical layer 293 bonded to at least a portion of the major surface 282. The microoptical layer 293 comprises a cured backfill layer 220 having a microstructured surface 222 and an opposing structured surface 224, and a cured layer 250 having a surface 254 adjacent the microstructured surface 222, the cured layer 250 being immediately adjacent the major surface 282. Cured layer 250 has a different refractive index than cured backfill layer 220. Typically, cured layer 250 has a lower refractive index than cured backfill layer 220. In this embodiment, an additional adhesive layer 251 is disposed between cured layer 250 and receptor substrate 280. In this embodiment, adhesive layer 251 is generally index matched to receptor substrate 280 (e.g. glass). The structured surface 224 is adjacent a low index material (such as air) having an index of refraction lower than the cured backfill layer 220.

Figure 2C:
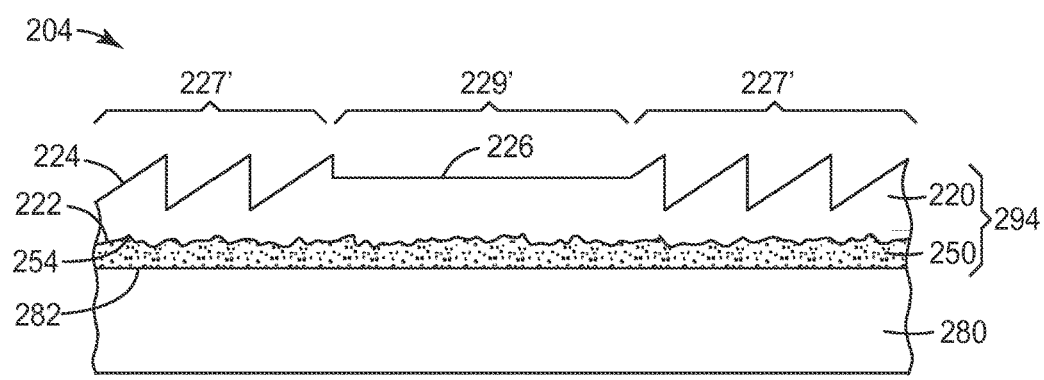

In FIG. 2C, microoptical glazing 204 includes a receptor substrate 280 such as a pane of glass having a major surface 282, and a microoptical layer 294 bonded to at least a portion of the major surface 282. The microoptical layer 294 comprises a cured backfill layer 220 having a microstructured surface 222, and an opposing surface that includes a first portion 227' having structured surface 224, and an adjacent second portion 229' having planar regions 226, that are disposed in a pattern. The microoptical layer 294 further includes a cured (e.g. adhesive) layer 250 having a surface 254 adjacent the microstructured surface 222. In one particular embodiment, microoptical layer 294 can result by transfer from a transfer tape 102 as shown and described in FIG. 1C. In one particular embodiment, the second portion 229' (i.e., the planar regions 226) of the microoptical layer 294 can result by reflow from an uncured portion of the transfer tape 100, the technique of reflow in Applicants' pending applications cited above. The structured surface 224 and planar regions 226 are adjacent a low index material (e.g. air) having an index of refraction lower than the cured backfill layer 220.

The pattern formed by the first and second portions 227', 229', of the microoptical glazing 201 can comprise a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

Figure 2D:
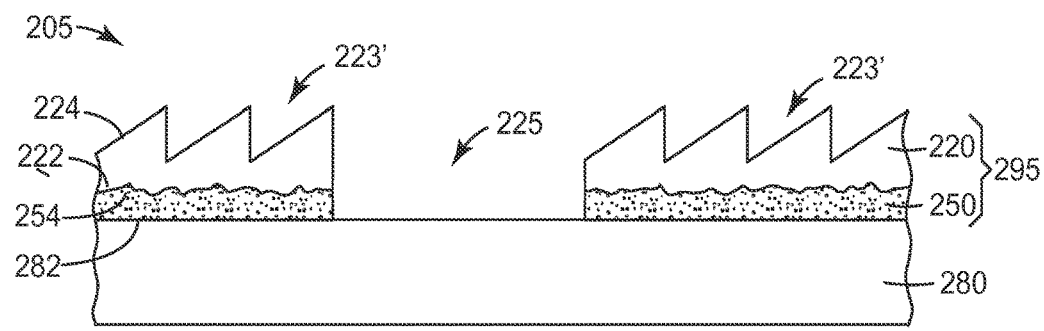

In FIG. 2D, microoptical glazing 205 includes a receptor substrate 280 such as a pane of glass having a major surface 282, and a microoptical layer 295 bonded to at least a portion of the major surface 282. The microoptical layer 295 comprises a cured backfill layer 220 having a microstructured surface 222 and an opposing surface that includes a first portion 223' having structured surface 224, and an adjacent second portions 225 lacking the microoptical layer 295, that are disposed in a pattern. The microoptical layer 295 further includes a cured (e.g. adhesive layer 250 having a surface 254 adjacent the microstructured surface 222, the cured diffuser layer (i.e. microstructured surface 222 together with 250) being immediately adjacent the major surface 282. The structured surface 224 of the first portion 223', and the adjacent second portions 225 are adjacent a low index material having an index of refraction lower than the cured backfill layer 220. The pattern formed by the first and second portions 223', 225, of the microoptical glazing 205 can comprise a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

FIG. 3A shows a schematic cross-sectional view of a portion of an Insulated Glazing Unit (IGU) 300. IGU 300 includes a first plane of glass 380' separated by a gap 394, from a second pane of glass 380 facing the first pane of glass 380'. The first pane of glass 380' includes an outside (i.e. exterior) sun-facing surface "a" and a first pane interior surface "b". The second pane of glass 380 includes a second pane interior surface "c" and an (i.e. exterior) room-facing surface "d". A microoptical layer 390 includes microstructured surface 322 and layer 350 having a different (e.g. lower) refractive index than cured backfill layer immediately adjacent the microstructured surface. Layer 350 is typically an adhesive that further bonds microoptical layer 390 to at least a portion of the second pane interior surface "c". The refractive index of (e.g. adhesive) layer 350 is generally index matched to the glass 380.

The structured surface 324 is adjacent a low index material 392 filling the gap 394 between the first and second panes of glass, 380', 380. In some cases the low index material 392 may comprise a gas or a vacuum. The low index layer or material provides index contrast with microoptical layer 390.

Figure 4:
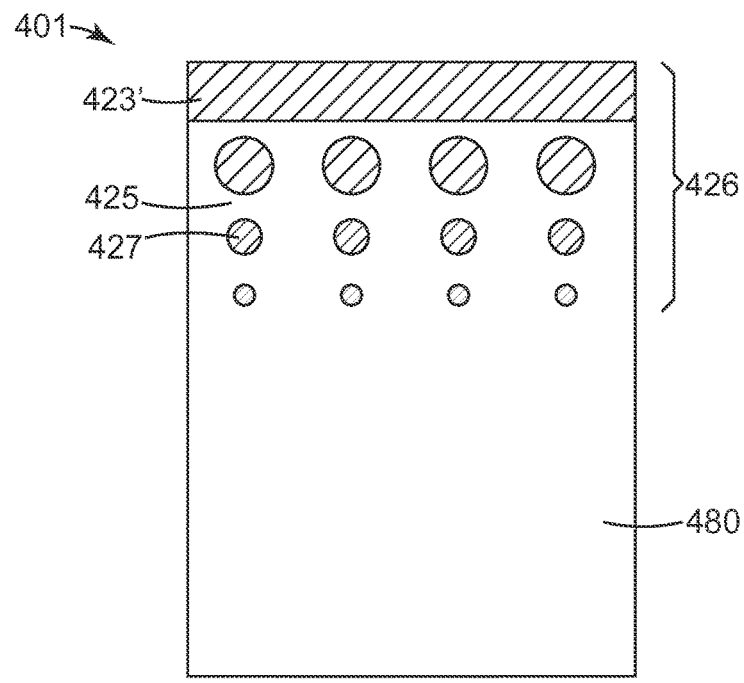
FIG. 4 shows a schematic front view of microoptical glazing.

It is to be understood that the pane of glass including the micooptical layer can have additional layers, such as shown in FIG. 2B FIG. 4 shows a schematic front view of a microoptical glazing 401, or alternately of a transfer tape useful for forming microoptical glazing 401, according to one aspect of the disclosure. Microoptical glazing 401 includes a pattern 426 of structured surface islands 427 and lines 423' separated by regions 425 similar to regions 225, 226 shown in FIG. 2C-2D on pane of glass 380. Pattern 426 shows a gradient pattern that has a decrease in areal density of the structured surface lines 423' and islands 427 moving away from an edge of microoptical glazing 401.

Figure 5:
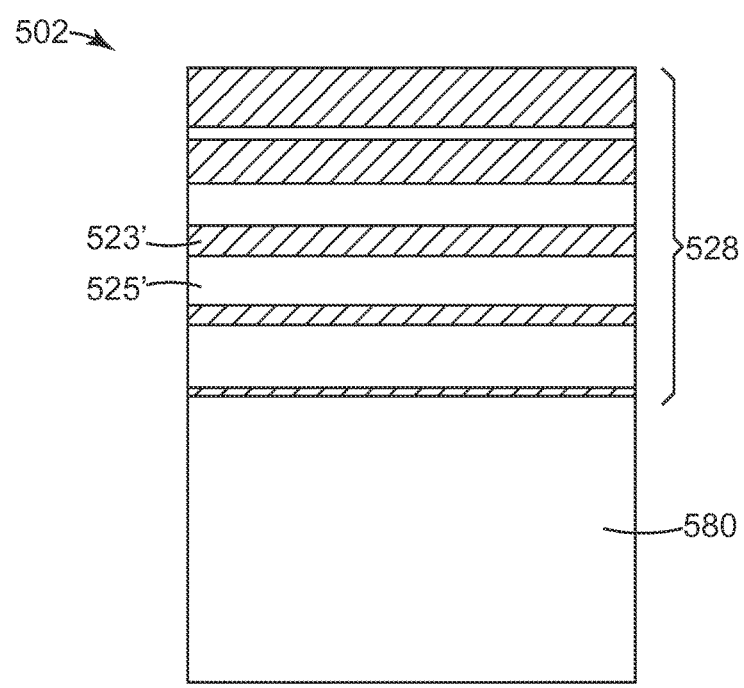
FIG. 5 shows a schematic front view of microoptical glazing.

FIG. 5 shows a schematic front view of a microoptical glazing 502, according to one aspect of the disclosure. Microoptical glazing 502 includes a pattern 528 of structured surface lines 523' separated by regions 525' similar to regions 225, 226 shown in FIG. 2C-2D on pane of glass 580. Pattern 528 shows a gradient pattern that has a decrease in areal density of the structured surface lines 523' moving away from an edge of microoptical glazing 502. It is to be understood that the pattern 526, 528 need not be a gradient pattern, and may be comprised of any desired assortment of islands, dots, lines, or any other regular or irregular shape.

Figure 6:
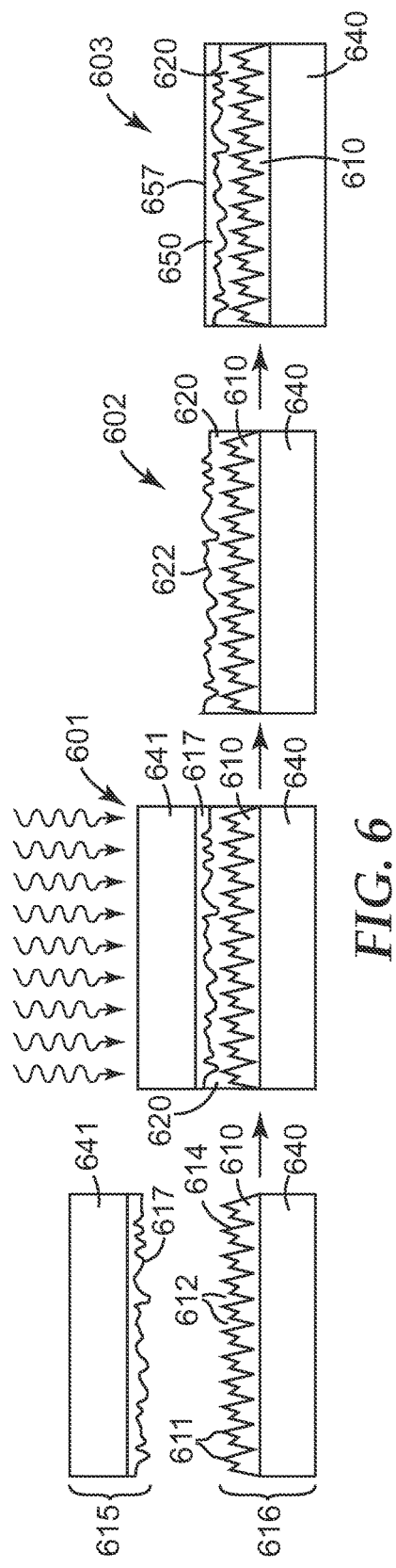
FIG. 6 is a schematic process flow diagram of forming a transfer film.

FIG. 6 is a schematic process flow diagram of an illustrative method of forming a transfer film. The method comprises providing a (e.g. first) template 616 comprising template layer 610 having structured surface 614 and optional carrier film 640. The method further comprises providing a curable backfill layer 620 (comprised of backfill material) on the structured surface 614 such that the backfill layer 620 has a major surface conforming with the structured surface of the first template and an opposing surface that is typically substantially planar (not shown), i.e. prior to contact with the second template 615.

The structured surface 614 of the template layer 610 comprises a plurality of peaks 611 and valleys 612. The backfill layer 620 typically has a thickness greater than the maximum height of the peaks 611.

The method further comprises contacting the opposing (e.g. planar) surface of the backfill layer with a second template 615. The second template comprises a microstructured layer surface 617 and optional carrier film 641. The method further comprises curing the backfill layer, i.e. while the structured surface 614 of the first template 616 and microstructured surface 617 of the second template 615 are in contact with backfill layer 620.

In some embodiments, the transfer tape 601 may comprise or consist of the first and second templates 616 and 615 and the cured backfill layer 620 therebetween. In this embodiment, an adhesive layer 650 may be applied to this transfer tape construction at the time of application to a receptor substrate (e.g. pane of glass). In this embodiment, the method of making microoptical glazing comprises providing the transfer tape 601, removing the second template 615; and bonding the cured microstructured backfill layer to pane of glass 680 with an adhesive 650, the adhesive having a different refractive index than the cured backfill layer 620.

In another embodiment, the method of making the transfer tape 602 further comprises removing the second template layer. In this embodiment, the transfer tape 602 may comprise or consist of the first template 616 and the cured backfill layer 620. In this embodiment, an adhesive layer 650 may also be applied to this transfer tape construction at the time of application to a receptor substrate (e.g. pane of glass). In this embodiment, the method of making microoptical glazing comprises providing the transfer tape and bonding the cured microstructured backfill layer to a pane of glass 680 with an adhesive 650, the adhesive having a different refractive index than the cured backfill layer 620.

In yet another embodiment, the method of making transfer tape 603 further comprises providing a layer 650 on the microstructured surface of the cured backfill layer, wherein the layer has a different refractive index than the cured backfill layer. However, in this embodiments layer 650 is not an adhesive. A removable release liner (not shown) may be provided on the exposed major surface 657 of the adhesive layer, i.e. on the opposing surface relative to the microstructured surface of the cured backfill layer 620. In this embodiment, the method of making microoptical glazing comprises providing the transfer tape, removing the release liner when present, and bonding the cured microstructured backfill layer to a pane of glass 680 by means of adhesive.

Figure 7:
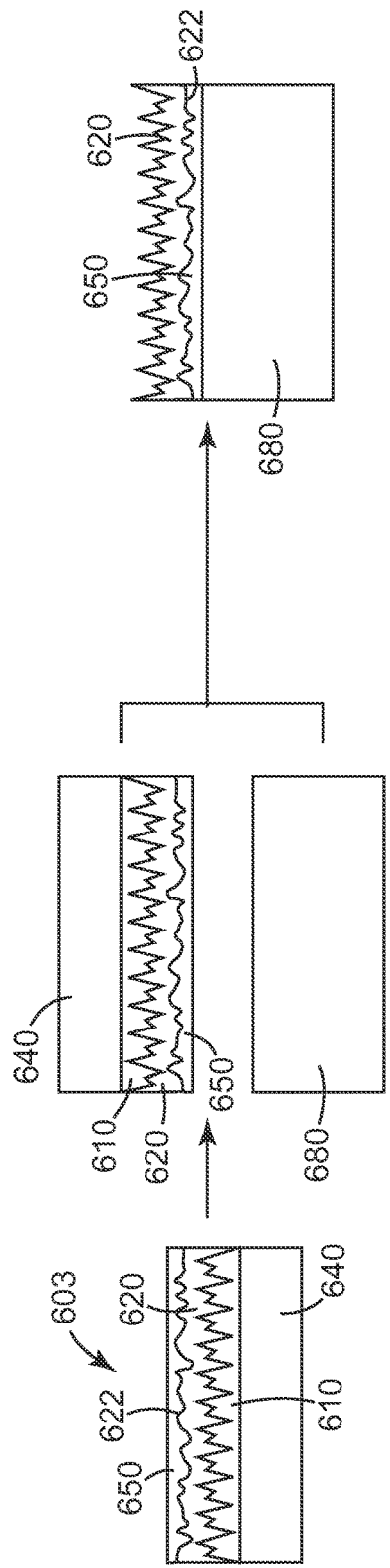
FIG. 7 is a schematic process flow diagram of forming a microoptical glazing.

FIG. 7 is a schematic process flow diagram of an illustrative method of forming microoptical glazing utilizing a transfer tape wherein the layer adjacent the microstructured surface of the backfill material is an adhesive and such adhesive is present on the transfer tape and the time the transfer tape 603 is utilized for microoptical glazing. Thus, this embodiment comprises providing a transfer tape wherein the transfer tape comprises a first template 616 and a cured backfill layer 650. The cured backfill layer 620 (comprised of backfill material) is disposed on the structured surface 614 such that the backfill layer 620 has a major surface conforming with the structured surface 614 of the first template and an opposing microstructured 622 surface. The transfer tape further comprises an adhesive 650 disposed on the microstructured surface 622. The method of microoptical glazing comprises bonding the cured backfill layer to a pane of glass 680 by mean of the adhesive 650 provided on the microstructured surface of the backfill layer.

Each of the methods of microoptical glazing further comprise removing the first template 616. Thus, the microoptical glazing comprises the pane of glass 680, an adhesive layer bonding the pane of glass to the microoptical layer and a microstructured surface 622 between the pane of glass 680 and the cured microoptical layer 610. The first template 616 is typically removed by peeling the template from the cured backfill layer 620. Further in each of the methods of micooptical glazing methods and micooptical glazing articles, the adhesive is typically index matched to the receptor substrate (glass).

Alternative Methods of Providing Microstructured Diffusive Interface

Although the methods and article described herein wherein the backfill layer comprise a microstructured surface is a favored embodiment, there are alternative methods of providing a diffusive layer between the microoptical layer and the room-facing exterior surface of the glass.

Figure 12:
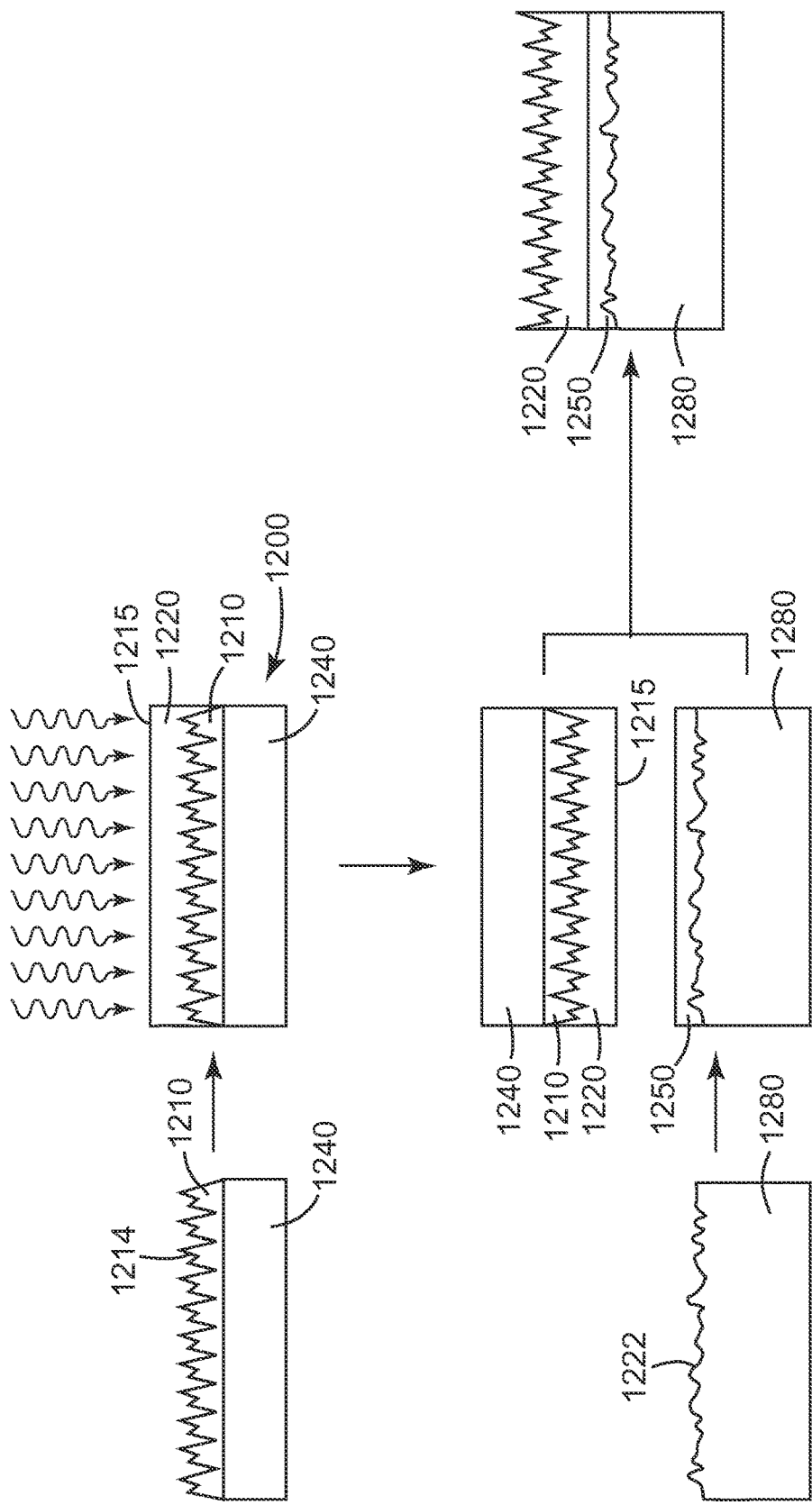
FIG. 12 is a schematic process flow diagram of an alternative method of forming a microoptical glazing with an embedded microstructured interface.

With reference to FIG. 12, in one embodiment, a method of making microoptical glazing comprises providing a transfer tape 1200, wherein the transfer tape comprises a first template layer 1210 having a structured surface 1214 and optional carrier film 1240 (the same as previously described embodiments). The transfer tape further comprises cured backfill layer 1220 on the structured surface 1214 such that the cured backfill layer has a major surface conforming with the structured surface 1214 of the first template. In this embodiment, the opposing surface 1215 of the cured backfill layer 1210 is planar, rather than microstructured. This method further comprises providing a piece of glass having a roughened surface 1222. The roughened surface may be providing by abrading the surface or providing a diffusive coating on the surface. The roughened surface or diffusive coating may have the same characteristics as the previously described microstructured surface 1222. The method further comprises bonding the roughened surface 1220 of the glass 1280 to the opposing (planar) surface of the cured backfill layer 1220 with an adhesive layer 1250. The adhesive 1250 typically has substantially the same refractive index as the cured backfill layer 1220. Further, adhesive 1250 typically has a different refractive index than the glass 1280.

Figure 13:
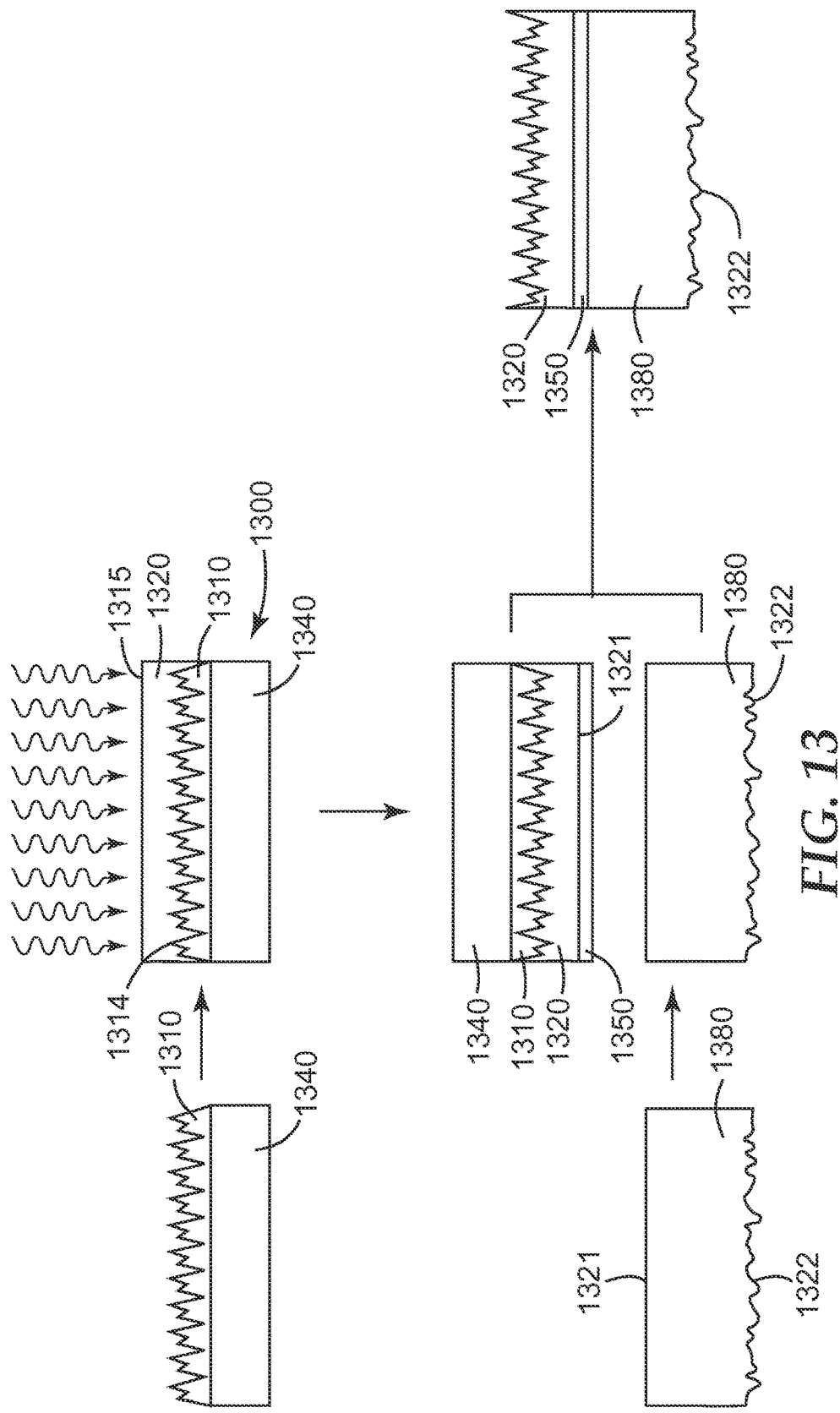
FIG. 13 is a schematic process flow diagram of an alternative method of forming a microoptical glazing with a microstructured interface disposed between the microoptical layer and room-facing exterior surface.
Figure 14:
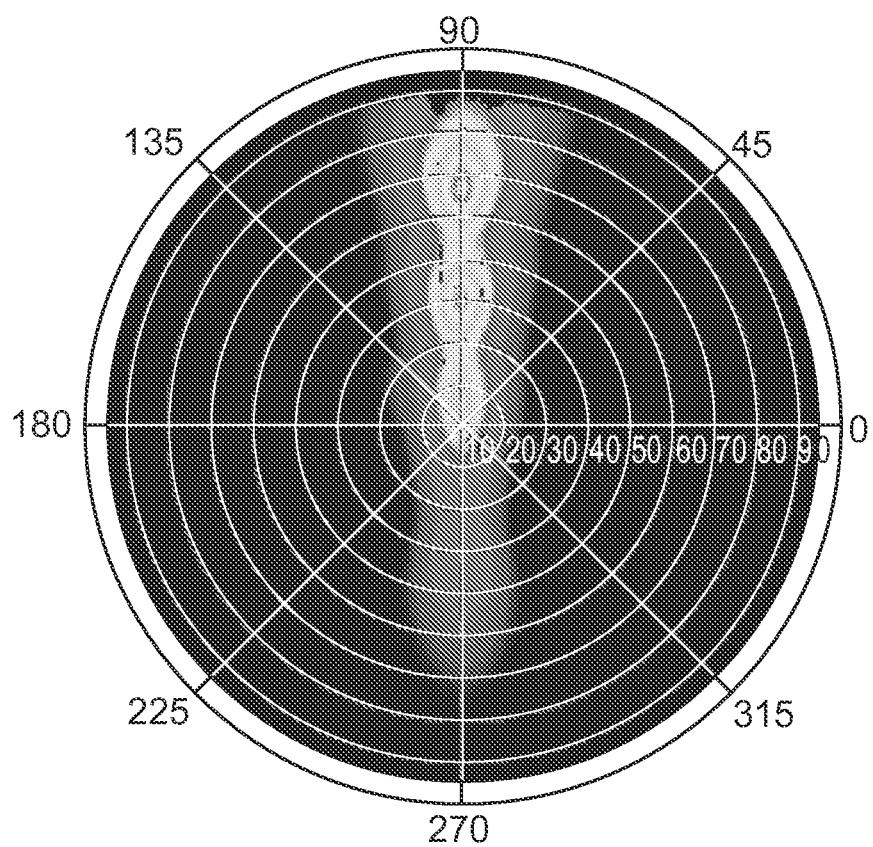
FIG. 14 depicts a bi-directional transmission distribution function (BTDF) plot for a microoptical glazing in accordance with the invention.

With reference to FIG. 13, in another embodiment, a method of making microoptical glazing comprises providing a transfer tape 1300, wherein the transfer tape comprises a first template layer 1310 having a structured surface 1314 and optional carrier film 1340 (the same as previously described embodiments). The transfer tape further comprises cured backfill layer 1320 on the structured surface 1314 such that the cured backfill layer has a major surface conforming with the structured surface 1314 of the first template. In this embodiment, the opposing surface 1315 of the cured backfill layer 1310 is planar, rather than microstructured. This method further comprises providing a piece of glass having a roughened surface 1322 and a planar 1321 (unroughened surface). The roughened surface may be providing by abrading the surface or providing a diffusive coating on the surface. The roughened surface or diffusive coating may have the same characteristics as the previously described microstructured surface 1322. The method further comprises bonding the planar surface 1321 of the glass 1380 to the opposing (planar) surface of the cured backfill layer 1320 with an adhesive layer 1350. The adhesive 1350 typically has substantially the same refractive index (index matched) as the cured backfill layer 1320. Further, adhesive 1350 typically has the same refractive index than the glass 1380.

Template Layer

The structured surface 114 is typically one-dimensional (1D), meaning the structures are periodic in only one dimension, that is, nearest-neighbor features are spaced equally in one direction along the surface, but not along the orthogonal direction. One-dimensional structures include, for example, continuous or elongated prisms or ridges, linear gratings, cylindrical or curved lens-shaped features, and random structures including chaos structures, and the like.

The structured surface 114 can generally include surface features that are any desirable height, for example heights suitable for microoptical refractive surfaces, and may range from a few nanometers to several microns in height, such as greater than about 1 micron, or greater than about 5 microns, or greater than about 10 microns, or greater than about 20 microns, or greater than about 50 microns, or greater than about 100 microns, or even about 2000 microns or more in height. The microoptical refractive surfaces may be useful for decorative, functional, or a combination of decorative and functional redistribution of light through a material, such as used in architectural glazing.

Although structured surface 114 may have structures that are smaller in size than microstructured surface 122, for convenience the term "structure" or "structured" is being used herein with reference to the (e.g. light directing) structures 114. Further, the term "microstructured" is being used with reference to the microstructured diffusive surface 122.

In one favored embodiment, the microoptical refractive structures (e.g. 390 of FIG. 3) formed from structured surface 114 are suitable for redirecting at least 75 or 80% of the light upwards for an input angle ranging from 30° to 60° (e.g. 45°).

Figure 11:
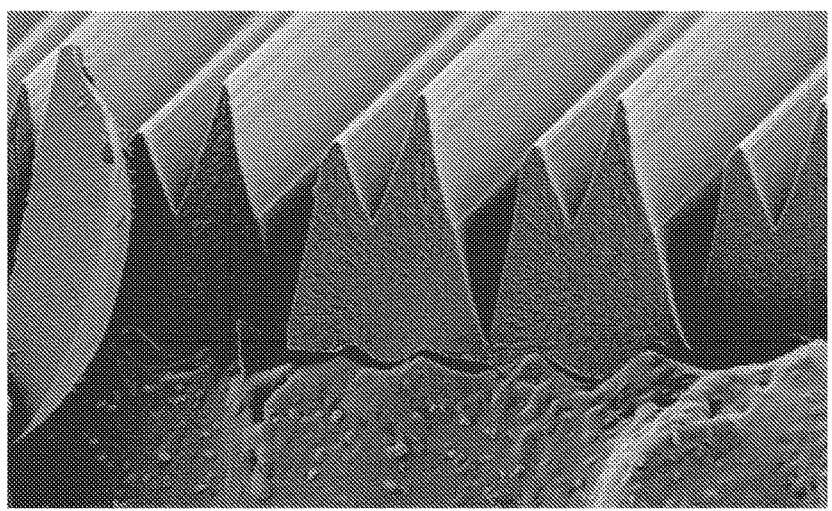
FIG. 11 is a scanning electron micrograph of a perspective view of a daylight redirecting structure disposed on a microstructured surface.

In some embodiments, such as depicted in FIG. 11 the (e.g. light redirecting) structures are substantially larger in size relative to the microstructures of the diffusive microstructured surface. For example, in some embodiment, the mean (peak) height of the diffusive microstructures is no greater than 5, 4, 3, 2, or 1 micron.

Microstructured Surface

Figure 3:
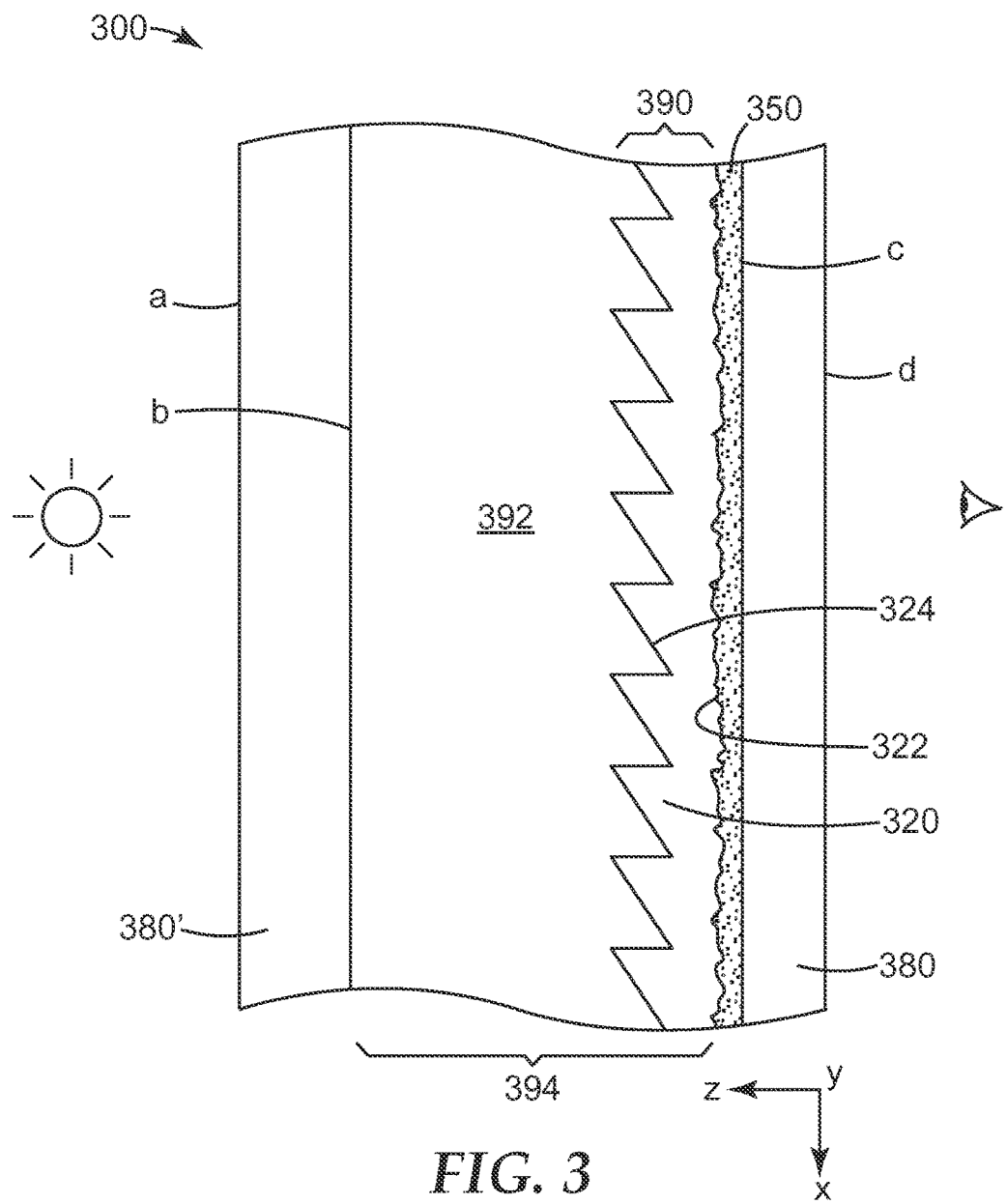
FIG. 3 shows a schematic cross-sectional view of a portion of an Insulated Glazing Unit (IGU)

With reference to FIG. 3, sunlight passing through the film and is redirected upwards by the structured microoptical layer 390 and then scattered or diffused as a result of refraction (and to some extent diffraction) by the topography of major surface 322 (or otherwise roughened surface, as will subsequently be described). The microstructured surface 322 (as well as 1222 and 1322) can be primarily present to diminish the occurrence of a solar column.

The microstructured surface extends generally along orthogonal in-plane directions, which can be used to define a local Cartesian x-y-z coordinate system. The topography of the microstructured surface can then be expressed in terms of deviations along a thickness direction (z-axis), relative to a reference plane (the x-y plane) lying parallel to the microstructured surface. In many cases, the topography of the microstructured surface is such that distinct individual microstructures can be identified. Such microstructures may be in the form of protrusions, which are made from corresponding cavities in the microstructured surface tool, or cavities, which are made from corresponding protrusions in the microstructured surface tool. The microstructures are typically limited in size along two orthogonal in-plane directions, i.e., when the microstructured surface is seen in plan view, individual microstructures do not typically extend indefinitely in a linear fashion along any in-plane direction. Whether protrusions or cavities, the microstructures may also in some cases be closely packed, i.e., arranged such that at least portions of boundaries of many or most adjacent microstructures substantially meet or coincide. The microstructures are also typically irregularly or non-uniformly dispersed on the microstructured surface. In some cases, some, most, or substantially all (e.g., >90%, or >95%, or >99%) of the microstructures may be curved or comprise a rounded or otherwise curved base surface. In some cases, at least some of the microstructures may be pyramidal in shape or otherwise defined by substantially flat facets.

The microstructured surface can also be characterized with reference to various roughness metrics, such as Ra and Rz, defined as follows:

Ra—Average roughness calculated over the entire measured array.

$$Ra = \frac{1}{MN}\sum_{i=1}^{M}\sum_{k=1}^{N}|Z_{jk}|$$

wherein $Z_{jk}$=the difference between the measured height of each pixel and the mean height of the array.

Rz is the average maximum surface height of the ten largest peak-to-valley separations in the evaluation area, $$Rz=1/10[(H_1+H_2+\ldots+H_{10})-(L_1+L_2+\ldots+L_{10})].$$

where H is a peak height and L is a valley height, and H and L have a common reference plane.

In some embodiments, Ra is no greater than 3, 2.5, 2, or 1.5 microns. In some embodiments, Rz is no greater than 30, 25, 20, or 15 microns.

In some embodiments, the size of a given microstructure may be expressed in terms of an equivalent circular diameter (ECD) in plain view, and the microstructures may have an average ECD of less than 15 microns, or less than 10 microns, or in a range from 4 to 10 microns, for example. The microstructured surface and structures can also be characterized with other parameters as discussed elsewhere herein, e.g., by an aspect ratio of the depth or height to a characteristic transverse dimension such as ECD, or the total length of ridges on the surface per unit area in plain view.

Light diffusion or scattering can be expressed in terms of "optical haze", or simply "haze". In some embodiments, the microstructured diffuser has a high haze, e.g., greater than 80% or greater than 90% haze when the layer adjacent the microstructured surface is air. Further, the optical haze, optical clarity, and other characteristics of the diffusive layer can be provided without the use of any beads (e.g. matte particles) at or on the microstructured surface, or elsewhere within the optical film.

In some embodiments, the microstructured diffuser diffuses a significant fraction of light incident at normal incidence scattered outside a cone of half angle 2.5 degrees, but inside a cone with a half angle less than about 15 degrees (or even 10 degrees) such that the daylight redirecting property is not impaired.

The diffusive microstructured surface can be made using any suitable fabrication method. The microstructures of the template are generally fabricated by casting and curing a polymerizable resin composition in contact with a tool surface such as described in U.S. Pat. No. 5,175,030 (Lu et al.) and U.S. Pat. No. 5,183,597 (Lu). The tool may be fabricated using any available fabrication method, such as by using engraving or diamond turning. Exemplary diamond turning systems and methods can include and utilize a fast tool servo (FTS) as described in, for example, PCT Published Application No. WO 00/48037, and U.S. Pat. Nos. 7,350,442 and 7,328,638.

Alternatively, the tool may be fabricated by electrodeposition. In one embodiment, the tool is prepared by forming a first layer of a metal by electrodepositing the metal using a first electroplating process resulting in a first major surface of the first layer having a first average roughness; and forming a second layer of the metal on the first major surface of the first layer by electrodepositing the metal on the first major surface using a second electroplating process resulting in a second major surface of the second layer having a second average roughness smaller than the first average roughness; as described in WO2014/081693; incorporated herein by reference.

The microstructured surface is typically the opposing surface of the backfill layer. Thus the refractive index of the microstructured surface is the same as the backfill layer. A layer 150 is disposed adjacent and is typically in direct contact with the microstructured surface. Layer 150 comprises a material having a different refractive index than the backfill layer. The difference is refractive index is at least 0.05 or 0.10. The microstructured surface of the backfill layer together with this adjacent layer forms a diffusive interface. In a favored embodiment, layer 150 is an (optically clear) adhesive that is also suitable for bonding the backfill layer to a receptor substrate (e.g. pane of glass). However, the transfer tape may provide a separate adhesive layer as well as other optional layers such as described with reference to FIG. 2B.

Optical Adhesive Layer

In several embodiments, layer 150, 250, or 350 in an (e.g. optical) adhesive layer. The (e.g. optical) adhesive can be a pressure sensitive adhesive or a structural adhesive that is not pressure sensitive. In typical embodiments, the adhesive is "optically clear" referring to a material that has a luminous transmission of greater than about 90 percent, a haze of less than about 2 or 1.5 percent, in the 350 to 800 nm wavelength range. The haze is typically less than 1 or 0.5 percent. Further, the opacity is typically less than about 1 percent. Both the luminous transmission and the haze can be determined using, for example, ASTM-D 1003-95. Typically, the optically clear adhesive may be visually free of bubbles. The optical adhesive is also desirably non-yellowing initially and after accelerated aging. For example, the CIELAB b* is typically less than 1.5, or 1.0 or 0.5 for a thickness of 10 mils (about 250 microns).

Although various optical adhesives are known in the art, in some embodiments the optical adhesive comprises an organosilicon polymer, such as a polydiorganosiloxane. The term "polydiorganosiloxane" refers to a divalent segment of formula

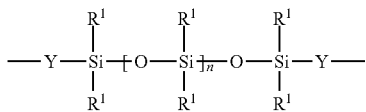

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 1 to 1500. In some embodiments, n is at least 25, 50, or greater.

In some embodiments, the optical adhesive comprises a polydiorganosilane polyoxamide copolymer, such as described in U.S. Pat. No. 7,947,376 and U.S. Pat. No. 8,765,881.

The polydiorganosiloxane have many desirable properties such as low glass transition temperatures, thermal and oxidative stability, resistance to ultraviolet radiation, low surface energy and hydrophobicity, and high permeability to many gases. Additionally, the copolymers exhibit good to excellent mechanical strength.

Pressure sensitive adhesives and heat activated adhesives can be formulated by combining the polydiorganosiloxane polyoxamides with a tackifier such as a silicate tackifying resin. As used herein, the term "pressure sensitive adhesive" refers to an adhesive that possesses sufficiently aggressive and permanent tack; sufficient strength to bond the micooptical layer to a receptor substrate such as glass; and in some embodiments typical sufficient cohesive strength to be removed cleanly from the receptor substrate. As used herein, the term "heat activated adhesive" refers to an adhesive composition that is essentially non-tacky at room temperature but that becomes tacky above room temperature above an activation temperature such as above about 30° C. Heat activated adhesives typically have the properties of a pressure sensitive adhesive above the activation temperature.

Tackifying resins such as silicate tackifying resins are added to the polydiorganosiloxane polyoxamide copolymer to provide or enhance the adhesive properties of the copolymer. The silicate tackifying resin can influence the physical properties of the resulting adhesive composition. For example, as silicate tackifying resin content is increased, the glassy to rubbery transition of the adhesive composition occurs at increasingly higher temperatures.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical silicate resins include MQ silicate tackifying resins, MQD silicate tackifying resins, and MQT silicate tackifying resins. These silicate tackifying resins usually have a number average molecular weight in the range of 100 to 50,000 or in the range of 500 to 15,000 and generally have methyl R' groups.

MQ silicate tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicate tackifying resin, and some are bonded only to other $SiO_{4/2}$ units.

Suitable silicate tackifying resins are commercially available from sources such as Dow Corning, Midland, Mich., General Electric Silicones Waterford, N.Y. and Rhodia Silicones, Rock Hill, S.C. Examples of particularly useful MQ silicate tackifying resins include those available under the trade designations SR-545 and SR-1000, both of which are commercially available from GE Silicones, Waterford, N.Y. Such resins are generally supplied in organic solvent and may be employed in the formulations of the adhesives of the present invention as received. Blends of two or more silicate resins can be included in the adhesive compositions.

The adhesive compositions typically contain 20 to 80 weight percent polydiorganosiloxane polyoxamide and 20 to 80 weight percent silicate tackifying resin based on the combined weight of polydiorganosiloxane polyoxamide and silicate tackifying resin. For example, the adhesive compositions can contain 30 to 70 weight percent polydiorganosiloxane polyoxamide and 30 to 70 weight percent silicate tackifying resin, 35 to 65 weight percent polydiorganosiloxane polyoxamide and 35 to 65 weight percent silicate tackifying resin, 40 to 60 weight percent polydiorganosiloxane polyoxamide and 40 to 60 weight percent silicate tackifying resin, or 45 to 55 weight percent polydiorganosiloxane polyoxamide and 45 to 55 weight percent silicate tackifying resin.

The adhesive composition can be solvent-free or can contain a solvent. Suitable solvents include, but are not limited to, toluene, tetrahydrofuran, dichloromethane, aliphatic hydrocarbons (e.g., alkanes such as hexane), or mixtures thereof. The adhesive compositions can further include other additives as known in the art.

Carrier Film

The first and second template layers may comprise an optional carrier film (e.g. 140, 640, 641). The optical carrier film can be any suitable film, including, for example, thermally stable flexible films that can provide mechanical support for the other layers. The optional carrier film 140 may be thermally stable above 50° C., or alternatively 70° C., or alternatively above 120° C. One example of an optional carrier film 140 is polyethylene terephthalate (PET). In some embodiments, the optional carrier film 140 can include paper, release-coated paper, non-wovens, wovens (fabric), metal films, and metal foils.

Various organic polymeric film substrates comprised of various thermosetting or thermoplastic polymers are suitable for use as the optional carrier film 140. The support may be a single layer or multi-layer film. Illustrative examples of polymers that may be employed as the optional carrier film include (1) fluorinated polymers such as poly(chlorotrifluoroethylene), poly(tetrafluoroethylene-cohexafluoropropylene), poly(tetrafluoroethylene-co-perfluoro(alkyl)vinylether), poly(vinylidene fluoride-cohexafluoropropylene); (2) ionomeric ethylene copolymers poly(ethylene-co-methacrylic acid) with sodium or zinc ions such as SURLYN-8920 Brand and SURLYN-9910 Brand available from E. I. duPont Nemours, Wilmington, Del.; (3) low density polyethylenes such as low density polyethylene; linear low density polyethylene; and very low density polyethylene; plasticized vinyl halide polymers such as plasticized poly (vinychloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or CH3 (CH2)n- where n is 0 to 12, and poly(ethylene-co-vinylacetate) "EVA"; and (5) (e.g.) aliphatic polyurethanes. The optional carrier film can be an olefinic polymeric material, typically comprising at least 50 wt-% of an alkylene having 2 to 8 carbon atoms with ethylene and propylene being most commonly employed. Other body layers include for example poly(ethylene naphthalate), polycarbonate, poly(meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate (TAC), polystyrene, styrene-acrylonitrile copolymers, cyclic olefin copolymers, epoxies, and the like. In some embodiments, the optional carrier film can include paper, release-coated paper, non-wovens, wovens (fabric), metal films, and metal foils.

Although the template can comprise a carrier film, the template layer is removed after the microoptical layer is transferred onto the receptor substrate (e.g. pane of glass). Thus, once the microoptical layer is transferred onto the receptor substrate (e.g. pane of glass), there is no organic polymeric film substrate between the microoptical layer and the pane of glass. Further, the insulating glazing unit typically does not include any organic polymeric film substrates. Such organic polymeric film substrates typically have a thickness of at least 1 or 2 mils.

Removable Template

The template layer 110 can be formed through embossing, replication processes, extrusion, casting, or surface structuring, for example. It is to be understood that the template layer 110 can have a structured surface 114 that may include nanostructures, microstructures, or hierarchical structures. In some embodiments, the template layer 110 can be compatible with patterning, actinic patterning, embossing, extruding, and coextruding.

Typically, the template layer 110 includes a photocurable material that can have a low viscosity during the replication process and then can be quickly cured to form a permanent crosslinked polymeric network "locking in" the replicated nanostructures, microstructures or hierarchical structures. Any photocurable resins known to those of ordinary skill in the art of photopolymerization can be used for the template layer 110. The resin used for the template layer 110 may be capable, when crosslinked, of releasing from the backfill layer 120 during the use of the disclosed transfer tapes, or should be compatible with application of a release layer and the process for applying the release layer.

Polymers that can be used as the template layer 110 also include the following: styrene acrylonitrile copolymers; styrene(meth)acrylate copolymers; polymethylmethacrylate; polycarbonate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; cyclic olefin polymers; and copolymers of acrylonitrile, butadiene, and styrene. One preferable polymer is the Lustran SAN Sparkle material available from Ineos ABS (USA) Corporation. Polymers for radiation cured template layers 110 include cross linked acrylates such as multifunctional acrylates or epoxies and acrylated urethanes blended with mono-and multifunctional monomers.

Patterned structured template layers can be formed by depositing a layer of a radiation curable composition onto one surface of a radiation transmissive support to provide a layer having an exposed surface, contacting a master with a preformed surface bearing a pattern capable of imparting a three-dimensional microstructure of precisely shaped and located interactive functional discontinuities including distal surface portions and adjacent depressed surface portions into the exposed surface of the layer of radiation curable composition on said support under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of support, depositing a layer of curable material onto the support, laminating the curable material against a master and curing the curable material using actinic radiation. The resulting roll of support with a patterned, structured template disposed thereon can then be rolled up. This method is disclosed, for example, in U.S. Pat. No. 6,858,253 (Williams et al.).

For extrusion or embossed template layers, the materials making up the template layer can be selected depending on the particular topography of the top structured surface that is to be imparted. In general, the materials are selected such that the structure is fully replicated before the materials solidify. This will depend in part on the temperature at which the material is held during the extrusion process and the temperature of the tool used to impart the top structured surface, as well as on the speed at which extrusion is being carried out. Typically, the extrudable polymer used in the top layer has a $T_g$ of less than about 140° C., or a $T_g$ of from about 85° C. to about 120° C., in order to be amenable to extrusion replication and embossing under most operating conditions. In some embodiments, the optional carrier film and the template layer can be coextruded at the same time. This embodiment requires at least two layers of coextrusion: a top layer with one polymer and a bottom layer with another polymer. If the top layer comprises a first extrudable polymer, then the first extrudable polymer can have a $T_g$ of less than about 140° C. or a $T_g$ or of from about 85° C. to about 120° C. If the top layer comprises a second extrudable polymer, then the second extrudable polymer, which can function as the optional carrier film, has a $T_g$ of less than about 140° C. or a $T_g$ of from about 85° C. to about 120° C. Other properties such as molecular weight and melt viscosity should also be considered and will depend upon the particular polymer or polymers used. The materials used in the template layer should also be selected so that they provide good adhesion to the optional carrier film so that delamination of the two layers is minimized during the lifetime of the article.

The extruded or coextruded template layer can be cast onto a master roll that can impart patterned structure to the template layer. This can be done batch-wise or in a continuous roll-to-roll process. Additionally, the optional carrier film can be extruded onto the extruded or coextruded template layer. In some embodiments, both layers: optional carrier film and template layers can be coextruded at once.

Useful polymers that may be used as the template layer polymer include one or more polymers selected from the group consisting of styrene acrylonitrile copolymers; styrene (meth)acrylate copolymers; polymethylmethacrylate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; and copolymers of acrylonitrile, butadiene, and styrene. Particularly useful polymers that may be used as the first extrudable polymer include styrene acrylonitrile copolymers known as TYRIL copolymers available from Dow Chemical; examples include TYRIL 880 and 125. Other particularly useful polymers that may be used as the template polymer include styrene maleic anhydride copolymer DYLARK 332 and styrene acrylate copolymer NAS 30, both from Nova Chemical. Also useful are polyethylene terephthalate blended with nucleating agents such as magnesium silicate, sodium acetate, or methylenebis(2,4-di-t-butylphenol) acid sodium phosphate.

Additional useful polymers include CoPENs (copolymers of polyethylenenaphthalate), CoPVN (copolymers of polyvinylnaphthalene) and polyimides including polyetherimide. Suitable resin compositions include transparent materials that are dimensionally stable, durable, weatherable, and readily formable into the desired configuration. Examples of suitable materials include acrylics, which have an index of refraction of about 1.5, such as PLEXIGLAS brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. The template layer may be prepared by casting directly onto an optional carrier film, such as disclosed in U.S. Pat. No. 5,691,846 (Benson). Polymers for radiation cured structures include cross linked acrylates such as multifunctional acrylates or epoxies and acrylated urethanes blended with mono- and multifunctional monomers.

The polymerizable composition used to prepare the template layer may be monofunctional or multifunctional (e.g, di-, tri-, and tetra-) in terms of radiation curable moieties. Examples of suitable monofunctional polymerizable precursors include styrene, alpha-methylstyrene, substituted styrene, vinyl esters, vinyl ethers, octyl (meth)acrylate, nonylphenol ethoxylate (meth)acrylate, isobornyl (meth)acrylate, isononyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxyl functional caprolactone ester (meth)acrylate, isooctyl (meth)acrylate, hydroxyethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofuryl (meth)acrylate, and any combinations thereof.

Examples of suitable multifunctional polymerizable precursors include ethyl glycol di(meth)acrylate, hexanediol di(meth)acrylate, triethylene glycol di(meth)acrylate, tetraethylene glycol di(meth)acrylate, trimethylolpropane tri(meth)acrylate, trimethylolpropanepropane tri(meth)acrylate, glycerol tri(meth)acrylate, pentaerythritol tri(meth)acrylate, pentaerythritol tetra(meth)acrylate, neopentyl glycol di(meth)acrylate, bisphenol A di(meth)acrylate, poly(1,4-butanediol) di(meth)acrylate, any substituted, ethoxylated or propoxylated versions of the materials listed above, or any combinations thereof.

The polymerization reactions generally lead to the formation of a three-dimensional "crosslinked" macromolecular network and are also known in the art as negative-tone photoresists, as reviewed by Shaw et al., "Negative photoresists for optical lithography," IBM Journal of Research and Development (1997) 41, 81-94. The formation of the network may occur through either covalent, ionic, or hydrogen bonding, or through physical crosslinking mechanisms such as chain entanglement. The reactions can also be initiated through one or more intermediate species, such as free-radical generating photoinitiators, photosensitizers, photoacid generators, photobase generators, or thermal acid generators. The type of curing agent used depends on the polymerizable precursor used and on the wavelength of the radiation used to cure the polymerizable precursor. Examples of suitable commercially available free-radical generating photoinitiators include benzophenone, benzoin ether, and acylphosphine photoinitiators, such as those sold under the trade designations "IRGACURE" and "DAROCUR" from Ciba Specialty Chemicals, Tarrytown, N.Y. Other exemplary photoinitiators include 2,2-dimethoxy-2-phenylacetophenone (DMPAP), 2,2-dimethoxyacetophenone (DMAP), xanthone, and thioxanthone.

Co-initiators and amine synergists may also be included to improve curing rates. Suitable concentrations of the curing agent in the crosslinking matrix range from about 1 wt. % to about 10 wt. %, with particularly suitable concentrations ranging from about 1 wt. % to about 5 wt. %, based on the entire weight of the polymerizable precursor. The polymerizable precursor may also include optional additives, such as heat stabilizers, ultraviolet light stabilizers, free-radical scavengers, and combinations thereof. Examples of suitable commercially available ultraviolet light stabilizers include benzophenone-type ultraviolet absorbers, which are available under the trade designation "UVINOL 400" from BASF Corp., Florham Park, N.J.; under the trade designation "CYASORB UV-1164" from Cytec Industries, West Patterson, N.J.; and under the trade designations "TINUVIN 900," and "TINUVIN 1130" from BASF Corp., Florham Park, N.J. Examples of suitable concentrations of ultraviolet light stabilizers in the polymerizable precursor range from about 0.1 wt. % to about 10 wt. %, with particularly suitable total concentrations ranging from about 1 wt. % to about 5 wt. %, relative to the entire weight of the polymerizable precursor.

Examples of suitable free-radical scavengers include hindered amine light stabilizer (HALS) compounds, hydroxylamines, sterically hindered phenols, and combinations thereof. Examples of suitable commercially available HALS compounds include the trade designated "TINUVIN 292" and "TINUVIN 123" from BASF Corp., Florham Park, N.J., and the trade designated "CYASORB UV-24" from Cytec Industries, West Patterson, N.J. Examples of suitable concentrations of free radical scavengers in the polymerizable precursor range from about 0.05 wt. % to about 0.25 wt. %.

The template layer 110 is typically removed from the cured backfill layer 120, to result in the final microoptical glazing. One method to reduce the adhesion of the backfill layer 120 to the template layer 110 is to apply an optional transfer layer 130 that can be a release coating as described above.

Release Layers

Reduction of the adhesion to any layer applied to it can be accomplished by application of a release layer or coating, and as such a release coating can be applied to any of the layers in the transfer film to facilitate release and can be used, for example, in a release liner. One method of applying a release coating to the surface of the support carrier film is with plasma deposition. An oligomer can be used to create a plasma crosslinked release coating. The oligomer may be in liquid or in solid form prior to coating. Typically the oligomer has a molecular weight greater than 1000. Also, the oligomer typically has a molecular weight less than 10,000 so that the oligomer is not too volatile. An oligomer with a molecular weight greater than 10,000 typically may be too non-volatile, causing droplets to form during coating. In one embodiment, the oligomer has a molecular weight greater than 3000 and less than 7000. In another embodiment, the oligomer has a molecular weight greater than 3500 and less than 5500. Typically, the oligomer has the properties of providing a low-friction surface coating. Suitable oligomers include silicone-containing hydrocarbons, reactive silicone containing trialkoxysilanes, aromatic and aliphatic hydrocarbons, fluorochemicals and combinations thereof. For example, suitable resins include, but are not limited to, dimethylsilicone, hydrocarbon based polyether, fluorochemical polyether, ethylene teterafluoroethylene, and fluorosilicones. Fluorosilane surface chemistry, vacuum deposition, and surface fluorination may also be used to provide a release coating.

Plasma polymerized thin films constitute a separate class of material from conventional polymers that can be used as release layers or coatings. In plasma polymers, the polymerization is random, the degree of cross-linking is extremely high, and the resulting polymer film is very different from the corresponding "conventional" polymer film. Thus, plasma polymers are considered by those skilled in the art to be a uniquely different class of materials and are useful in the disclosed articles. In addition, there are other ways to apply release coatings to the template layer, including, but not limited to, blooming, coating, coextrusion, spray coating, electrocoating, or dip coating.

The release coating or layer may be a fluorine-containing material, a silicon-containing material, a fluoropolymer, a silicone polymer, or a poly(meth)acrylate ester derived from a monomer comprising an alkyl (meth)acrylate having an alkyl group with 12 to 30 carbon atoms. In one embodiment, the alkyl group can be branched. Illustrative examples of useful fluoropolymers and silicone polymers can be found in U.S. Pat. No. 4,472,480 (Olson), U.S. Pat. Nos. 4,567,073 and 4,614,667 (both Larson et al.). Illustrative examples of a useful poly(meth)acrylate ester can be found in U.S. Pat. Appl. Publ. No. 2005/118352 (Suwa). The removal of the liner shouldn't negatively alter the surface topology of the transfer layer.

Backfill Layer

The material of the backfill layer 120 typically can meet several requirements. First, it can conform to the structured surface 114 of the template layer 110 onto which it is coated. This means that the viscosity of the coating solution should be low enough to be able to flow into very small features without the entrapment of air bubbles, which will lead to good fidelity of the replicated structure. If it is solvent based, it should be coated from a solvent that does not dissolve the underlying template layer 110, which would cause cracking, or other detrimental defects of the backfill layer 120. It is desirable that the solvent has a boiling point below that of the template layer 110 glass transition temperature. Preferably, isopropanol, butyl alcohol and other alcoholic solvents have been used. Second, the material should cure with sufficient mechanical integrity (e.g., "green strength"). If the material of the backfill layer 120 does not have enough green strength after curing, the transfer structured surface 124 features of the backfill layer 120 can slump and the replication fidelity can degrade. Third, for some embodiments, the refractive index of the cured material should be tailored to produce the proper optical effect. Fourth, the material of the backfill layer 120 should be thermally stable (e.g., showing minimal cracking, blistering, or popping) above the temperature of the upper range of the future process steps.

Polymers are known in the art that contain a combination of organic and inorganic moieties. The organic moiety in the polymer may be used for curability, flexibility, etc, while the inorganic moiety may be used for higher heat resistance, weatherability, durability, etc. One such polymer is available from Nagase Co., Osaka, Japan under the trade designation "SA-250P". The polymer can be cured using methods known in the art, such as ultraviolet irradiation combined a photoinitiator that absorbs ultraviolet light, for example. After curing, this polymer has a refractive index of ~1.6, and a high transmittance (T>88%) as measured by a refractometer and a UV-Vis spectrophotometer, respectively. Other curable polymers that contain a combination of organic and inorganic moieties have a refractive index of about 1.50 after curing.

In some cases, the highly branched organosilicon material comprises highly branched organosilicon oligomers, highly branched organosilicon polymers, or combinations thereof. The backfill layer 120 may be capable of being cured by actinic radiation such as ultraviolet (UV) radiation, ionizing radiation, thermally, or by a combination thereof. The highly branched organosilicon material may further include inorganic particles, such as glasses or ceramics that can be index-matched to the organosilicon material, forming a composite material, such as a nanoparticle-filled silsesquioxane.

The backfill material may comprise or consist of a class of the highly branched organosilicon oligomers and polymers of a general formula (as below) which can be further reacted to form crosslinked networks by homo-condensation of Si—OH groups, hetero-condensation with the remaining hydrolyzable groups (e.g. alkoxy), and/or by reactions of the functional organic groups (e.g. ethylenically unsaturated such as vinyl, acrylate, or methacrylate). This class of materials is derived primarily from organosilanes of a general formula:

$$R_xSiZ_{4-x},$$

wherein

R is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these.

Z is a hydrolyzable group, such as halogen (containing the elements F, Br, Cl, or I), $C_1$-$C_{20}$ alkoxy, $C_5$-$C_{20}$ aryloxy, and/or combinations of these.

The majority of the composition may consist of $RSiO_{3/2}$ units thus the class of materials is often called silsesquioxanes (or T-resins), however they may also contain mono- ($R_3Si-O_{1/2}$), di-($R_2SiO_{2/2}$) and tetrafunctional groups ($Si-O_{4/2}$). Organically-modified disilanes of the formula:

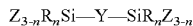

are often used in the hydrolyzable compostions to further modify the properties of the materials (to form the so-called bridged silsesquioxanes), the R and Z groups are defined above. The materials can be further formulated and reacted with metal alkoxides ($M(OR)_m$) to form metallo-silsesquioxanes.

The backfill material may comprise or consist of highly branched organosilicon oligomers and polymers of a general formula:

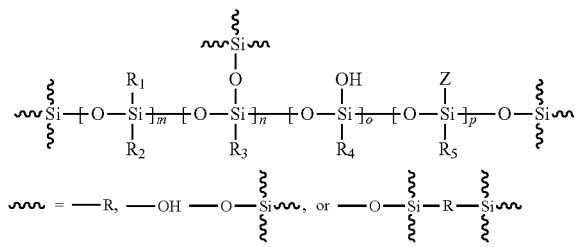

$R_1$, $R_2$, $R_3$, $R_4$, and $R_5$ are independently selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

Z is a hydrolyzable group, such as halogen(containing the elements F, Br, Cl, or I), $C_1$-$C_{20}$ alkoxy, $C$-$C_{20}$ aryloxy, and/or combinations of these.

m is an integer from 0 to 500;
n is an integer from 1 to 500;
p is an integer from 0 to 500;
q is an integer from 0 to 100.

As used herein, the term "substituted" refers to one substituted with at least a substituent selected from the group consisting of a halogen (containing the elements F, Br, Cl or I), a hydroxy group, an alkoxy group, a nitro group, a cyano group, an amino group, an azido group, an amidino group, a hydrazine group, a hydrazono group, a carbonyl group, a carbamyl group, a thiol group, an ester group, a carboxyl group or a salt thereof, a sulfonic acid group or a salt thereof, a phosphoric acid group or a salt thereof, alkyl group, a $C_2$ to $C_{20}$ alkenyl group, a $C_2$ to $C_{20}$ alkynyl group, $C_6$ to $C_{30}$ aryl group, a $C_7$ to $C_{13}$ arylalkyl group, a $C_1$ to $C_4$ oxyalkyl group, a $C_1$ to $C_{20}$ heteroalkyl group, a $C_3$ to $C_{20}$ heteroarylalkyl group, a $C_3$ to $C_{30}$ cycloalkyl group, a $C_3$ to $C_{15}$ cycloalkenyl group, a $C_6$ to $C_{15}$ cycloalkynyl group, a heterocycloalkyl group, and a combination thereof, instead of hydrogen of a compound.

The resulting highly branched organosilicon polymer has a molecular weight in a range from 150 to 300,000 Da or preferably in a range from 150 to 30,000 Da.

Materials that may be used for the backfill include polysiloxane resins, polysilazanes, polyimides, silsesquioxanes of bridge or ladder-type, silicones, and silicone hybrid materials and many others. These molecules typically have an inorganic component which leads to high dimensional stability, mechanical strength, and chemical resistance, and an organic component that helps with solubility and reactivity.

In many embodiments the thermally stable molecular species includes silicon, hafnium, strontium, titanium or zirconium. In some embodiments the thermally stable molecular species includes a metal, metal oxide or metal oxide precursor. Metal oxide precursors may be used in order to act as an amorphous "binder" for inorganic nanoparticles, or they may be used alone.

The backfill compositions described herein may comprise inorganic nanoparticles. These nanoparticles can be of various sizes and shapes. The nanoparticles can have an average particle diameter less than about 1000 nm, less than about 100 nm, less than about 50 nm, or less than about 35 nm. The nanoparticles can have an average particle diameter from about 3 nm to about 50 nm, or from about 3 nm to about 35 nm, or from about 5 nm to about 25 nm. If the nanoparticles are aggregated, the maximum cross sectional dimension of the aggregated particle can be within any of these ranges, and can also be greater than about 100 nm. "Fumed" nanoparticles, such as silica and alumina, with primary size less than about 50 nm, may also be used, such as CAB-OSPERSE PG 002 fumed silica, CAB-O-SPERSE 2017A fumed silica, and CAB-OSPERSE PG 003 fumed alumina, available from Cabot Co. Boston, Mass. Their measurements can be based on transmission electron microscopy (TEM). Nanoparticles can be substantially fully condensed. Fully condensed nanoparticles, such as the colloidal silicas, typically have substantially no hydroxyls in their interiors. Non-silica containing fully condensed nanoparticles typically have a degree of crystallinity (measured as isolated particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index. Various shapes of the inorganic or organic nanoparticles may be used, such as sphere, rod, sheet, tube, wire, cube, cone, tetrahedron, and the like.

The size of the particles is generally chosen to create a desired optical effect such as transparence or scattering. The nanomaterial composition can also impart various optical properties (i.e refractive index, birefringence), electrical properties (e.g conductivity), mechanical properties (e.g toughness, pencil hardness, scratch resistance) or a combination of these properties. It may be desirable to use a mix of organic and inorganic oxide particle types to optimize an optical or material property and to lower total composition cost.

Examples of suitable inorganic nanoparticles include metal nanoparticles or their respective oxides, including the elements zirconium (Zr), titanium (Ti), hafnium (Hf), aluminum (Al), iron (Fe), vanadium (V), antimony (Sb), tin (Sn), gold (Au), copper (Cu), gallium (Ga), indium (In), chromium (Cr), manganese (Mn), cobalt (Co), nickel (Ni), zinc (Zn), yttrium (Y), niobium (Nb), molybdenum (Mo), technetium (Te), ruthenium (Ru), rhodium (Rh), palladium (Pd), silver (Ag), cadmium (Cd), lanthanum (La), tantalum (Ta), tungsten (W), rhenium (Rh), osmium (Os), iridium (Ir), platinum (Pt), and any combinations thereof.

Examples of suitable inorganic nanoparticles include elements known as rare earth elements and their oxides, such as lanthanum (La), cerium ($CeO_2$), praseodymium ($Pr_6O_{11}$), neodymium ($Nd_2O_3$), samarium ($Sm_2O_3$), europium ($Eu_2O_3$), gadolinium ($Gd_2O_3$), terbium ($Tb_4O_7$), dysprosium ($Dy_2O_3$), holmium ($Ho_2O_3$), erbium ($Er_2O_3$), thulium ($Tm_2O_3$), ytterbium ($Yb_2O_3$) and lutetium ($Lu_2O_3$).

The nanoparticles are typically treated with a surface treatment agent. Surface-treating the nano-sized particles can provide a stable dispersion in the polymeric resin. Preferably, the surface-treatment stabilizes the nanoparticles so that the particles will be well dispersed in a substantially homogeneous composition. Furthermore, the nanoparticles can be modified over at least a portion of its surface with a surface treatment agent so that the stabilized particle can copolymerize or react with the parts of the composition during curing. In general, a surface treatment agent has a first end that will attach to the particle surface (covalently, ionically or through strong physisorption) and a second end that imparts compatibility of the particle with the composition and/or reacts with composition during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the composition. The required amount of surface modifier is dependent upon several factors such particle size, particle type, modifier molecular weight, and modifier type. In general it is preferred that approximately a monolayer of modifier is attached to the surface of the particle. The attachment procedure or reaction conditions required also depend on the surface modifier used. For silanes, it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilyl-propyl) methoxyethoxyethyl carbamate ($PEG_3TES$), N-(3-triethoxysilylpropyl) methoxyethoxyethyl carbamate ($PEG_2TES$), 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy) silane, styrylethyltrimethoxysilane, mercaptopropyltrimethoxysilane, 3-5 glycidoxypropyltrimethoxysilane, acrylic acid, methacrylic acid, oleic acid, stearic acid, dodecanoic acid, 2-[2-(2-methoxyethoxy) ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W. Va. under the trade designation "Silquest A1230", has been found particularly suitable.

In some embodiments, the backfill layer includes a photocurable (e.g. polysiloxane) material that can have a low viscosity during the replication process and then can be quickly cured to form a permanent crosslinked polymeric network "locking in" the replicated nanostructures, microstructures or hierarchical structures.

Patterning

The transfer tape, microoptical glazing, and insulated glass units can comprise microoptical pattern such as depicted in FIGS. 4 and 5. In some embodiments, the backfill layer is disposed in a pattern on the structured surface of the template layer. Alternatively, and more typically in combination thereof, the adhesive layer is disposed in a pattern on the microstructured surface of the (e.g. patterned) backfill layer. In some embodiments, the area fraction of the structured surface regions at the top edge is >90% and the area fraction of the structured surface regions at an opposing bottom edge is <10%. The backfill layer material and/or the adhesive can be applied by printing or otherwise depositing material in a pattern, such as by screen printing, flexo printing, ink-jet printing, gravure printing, and the like, such as by techniques known to those of skill in the art.

When the backfill layer and adhesive are patterned, the backfill layer and adhesive layer can be discontinuous along the x-axis, discontinuous along the y-axis (e.g. vertical or horizontal strip pattern) or discontinuous along both the x-axis and y-axis (e.g. islands) such as depicted in FIGS. 1B and 2C.

In another embodiment, a method of making a transfer tape is described wherein the backfill layer and adhesive layer are continuous along the x-axis and y-axis when the transfer tape is made. Hence, the backfill layer and adhesive layer are not pattern coated. However, the transfer tape is (e.g. score) cut such that once the uncut portion(s) is removed, the transfer tape comprises a patterned backfill layer and adhesive, such as depicted in FIG. 1B.

With reference to FIG. 8A, the method comprises providing transfer tape 801 comprising a (first) template comprising an optional carrier film 840 and template layer 810 and a micooptical layer disposed at least a portion of the first template. The microoptical layer comprises a cured backfill layer 820 wherein the microoptical layer has a structured surface 814 and an opposing surface. An adhesive layer 850 is disposed on the opposing surface of the micooptical layer. In typical embodiments, a release liner 870 is provided on the opposing surface of the adhesive layer 850. The transfer tape having the continuous backfill layer 820 and continuous adhesive layer 850 disposed on a continuous release liner 870 is then subject to score cutting through the first template 802, cured backfill layer 820, and adhesive layer 850 such that cut portions remain of the release liner and the uncut portion can be removed (e.g. as a single continuous piece). The score cutting can be conducted by any suitable means such as laser cutting and rotary die cutting.

In some embodiments, the opposing surface of the microoptical layer is a microstructured surface 822. In this embodiment, the adhesive 850 has a refractive index that differs from the backfill layer. Although the microstructured surface 822 is depicted, this aspect is optional with regard to the score cut transfer tape With reference to FIG. 8B, transfer tape 801 or 802 can be utilized in methods of making microoptical glazing. Such method comprises providing transfer tape 801, having a plurality of scored portions disposed on a release liner 870, removing the release liner 870, and bonding adhesive 850 of the score cut portions to a pane of glass 880. The method further comprises removing the first template 840 comprising an optional carrier film 840 and template layer 810. When transfer tape 802 is utilized, the uncut portion(s) of first template 840 together with the microoptical layer 820 and adhesive 850 (designated by the portions with an "X") is removed (e.g. as a single continuous piece) prior to bonding adhesive 850 to the pane of glass 880. Adhesive 850 is typically index matched to the pane of glass 840.

Release Liner

The optional release liner 170 can be a release liner that can protect the patterned structured layer and/or protect adhesive layer (e.g. 150, 850) during handling and can be easily removed, when desired, for transfer of the structured layer or part of the structured layer to a receptor substrate. Exemplary liners useful for the disclosed patterned structured tape are disclosed in PCT Pat. Appl. Publ. No. WO 2012/082536 (Baran et al.).

The liner may be flexible or rigid. Preferably, it is flexible. A suitable liner (preferably, a flexible liner) is typically at least 0.5 mil thick, and typically no more than 20 mils thick. The liner may be a backing with a release coating disposed on its first surface. Optionally, a release coating can be disposed on its second surface. If this backing is used in a transfer article that is in the form of a roll, the second release coating has a lower release value than the first release coating. Suitable materials that can function as a rigid liner include metals, metal alloys, metal-matrix composites, metalized plastics, inorganic glasses and vitrified organic resins, formed ceramics, and polymer matrix reinforced composites.

Exemplary liner materials include paper and polymeric materials. For example, flexible backings include densified Kraft paper (such as those commercially available from Loparex North America, Willowbrook, Ill.), poly-coated paper such as polyethylene coated Kraft paper, and polymeric film. Suitable polymeric films include polyester, polycarbonate, polypropylene, polyethylene, cellulose, polyamide, polyimide, polysilicone, polytetrafluoroethylene, polyethylenephthalate, polyvinylchloride, polycarbonate, or combinations thereof. Nonwoven or woven liners may also be useful. Embodiments with a nonwoven or woven liner could incorporate a release coating. CLEARSIL T50 Release liner; silicone coated 2 mil polyester film liner, available from Solutia/CP Films, Martinsville, Va., and LOPAREX 5100 Release Liner, fluorosilicone-coated 2 mil polyester film liner available from Loparex, North America, Willowbrook, Ill., are examples of useful release liners.

Other Additives

Various additives, as known in the art, may be included in any of the layers of the transfer tape such as antioxidants, stabilizers, inhibitors, and the like to prevent premature curing during the process of storage, shipping and handling of the film.

Receptor Substrate

A particular advantage of the transfer films and the associated process of applying the transfer films, is the ability to impart structure to receptor surfaces with large surfaces, such as architectural glass. The large dimensions of the lamination transfer films are possible by using a combination of roll-to-roll processing and a cylindrical master template. An additional advantage of the transfer process disclosed herein is the ability to impart structure to receptor surfaces that are not planar. The receptor substrate can be curved, bent twisted, or have concave or convex features, due to the flexible format of the transfer tape. Receptor substrates may include, for example, automotive glass, sheet glass, flexible electronic substrates such as circuitized flexible film, display backplanes, solar glass, metal, polymers, polymer composites, and fiberglass. Still further, an additional advantage can be the ability to pattern the transfer layers by printing or otherwise depositing material in a pattern on the template films, by techniques known to those of skill in the art, as described elsewhere.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

The term "actinic radiation" refers to wavelengths of radiation that can crosslink or cure polymers and can include ultraviolet, visible, and infrared wavelengths and can include digital exposures from rastered lasers, thermal digital imaging, and electron beam scanning.

The term "polysiloxanes" refers to highly branched oligomeric or polymeric organosilicon compounds that include silicon-oxygen bonds and may include carbon-carbon and/or carbon-hydrogen bonds.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

EXAMPLES

Transfer films with embedded microstructures were prepared and transferred to glass substrates. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Mo. unless otherwise noted.

Comparative Example 1

Lamination Transfer Film with Daylight Redirecting Optics
Template/Release Coating The base film was a 2-mil PET, primed with a UV cured primer comprising 50/50 blend of UVACURE 1500 (available from Allnex, Smyrna, Ga.) and LAROMER TMPTA (available from BASF Corp., Wyandotte, Mich.) with 1% OMAN 071 photoinitiator (available from Gelest Inc., Philadelphia, Pa.). The replicating resin was a 75/25 blend of PHOTOMER 6210 (available from IGM Resins, Charlotte, N.C.) and hexanediol diacrylate with a photoinitator package comprising of 0.5% LUCRIN TPO (available from BASF Corp., Wyandotte, Mich.). Replication of the resin was conducted at 30 fpm on a tool heated to 125° F. The tool having the same shape as the desired daylight redirecting structure was fabricated using a diamond-turning process. The desired periodic structure comprised two peaks and four facets per period with one facet per side of the function as shown in FIG. 11. The peaks were rounded slightly as a result of the diamond-turning process.

Radiation from a Fusion "D" lamp operating at 600 W/in was transmitted through the film to cure the resin while in contact with the tool. The composite film was removed from the tool and the patterned side of the film was post UV cured using a Fusion "D" lamp operating at 360 W/in while in contact with a roll heated to 100 deg F.

The replicated template film was placed in a chamber and the surface primed with oxygen gas at a flow rate of standard cc 200/min (SCCM), a pressure of 200 mTorr and RF power of 500 Watts for 30 seconds. Subsequently, the samples were exposed to octafluoropropane ($C_3F_8$) plasma at a flow rate of 250 SCCM but no added oxygen. The pressure in the chamber was 6 mTorr, the RF power 1000 Watts was maintained for 90 seconds.

Backfill/Coating

The release coated template film was die coated on a roll to roll processing line at a line speed of 5 Ft/min and a coating width of 4 inches and a flow rate of 5.8 cc/min with a 70% solids solution of SA-250P (Nagase & CO., LTD, Tokyo, Japan) in MEK. The sample was dried by passing over two five foot heated plates at 200 F and cured with a Fusion H bulb under a nitrogen atmosphere.

Adhesive Coating

The backfilled template film was notch-bar coated with a 2 mil gap with a silicone adhesive (an adhesive composition was prepared using the same proportions and same MQ resin as described in Example 1 of U.S. Pat. No. 7,947,376 but using the polymer solution described in U.S. Pat. No. 8,765,881 Example 12.) 30% solids a in ethyl acetate solution. The solution was dried at 50° C. for 5 min on a hot plate, and then hand laminated to a release liner M117 (SILICONATURE USA, LLC, Chicago, Ill.). This formed the Lamination Transfer Film with Daylight Redirecting Optics.

Daylight Redirecting Optics on Glass

Polished glass slides, 50 mm×50 mm, were first cleaned with a lint free cloth, then sonicated in a wash chamber for 20 minutes with detergent, then 20 minutes in each of two cascading rinse chambers with heated water. The slides were then dried for 20 minutes in an oven with circulating air. The release liner on the Lamination Transfer Film with Daylight Redirecting Optics from above was stripped by hand. This film was laminated, adhesive side down, to the glass slide with a roller. The template film was peeled off and removed, leaving Daylight Redirecting Optics on Glass.

Comparative Example 2

Lamination Transfer Film with Daylight Redirecting Optics Having a Bulk Diffuser
Template/Release Coating The base film was a 2-mil PET, primed with a UV cured primer comprising 50/50 blend of UVACURE 1500 (available from Allnex, Smyrna, Ga.) and LAROMER TMPTA (available from BASF Corp., Wyandotte, Mich.) with 1% OMAN 071 photoinitiator (available from Gelest Inc., Philadelphia, Pa.). The replicating resin was a 75/25 blend of PHOTOMER 6210 (available from IGM Resins, Charlotte, N.C.) and hexanediol diacrylate with a photoinitator package comprising of 0.5% LUCRIN TPO (available from BASF Corp., Wyandotte, Mich.). Replication of the resin was conducted at 30 fpm on a tool heated to 125 deg F. The tool having the same shape as the desired daylight redirecting structure was fabricated using a diamond-turning process. The desired periodic structure comprised two peaks and four facets per period with one facet per side of the function as shown in FIG. 11. The peaks were rounded slightly as a result of the diamond-turning process.

Radiation from a Fusion "D" lamp operating at 600 W/in was transmitted through the film to cure the resin while in contact with the tool. The composite film was removed from the tool and the patterned side of the film was post UV cured using a Fusion "D" lamp operating at 360 W/in while in contact with a roll heated to 100 deg F.

The replicated template film was placed in a chamber and the surface primed with oxygen gas at a flow rate of standard cc 200/min (SCCM), a pressure of 200 mTorr and RF power of 500 Watts for 30 seconds. Subsequently, the samples were exposed to octafluoropropane ($C_3F_8$) plasma at a flow rate of 250 SCCM but no added oxygen. The pressure in the chamber was 6 mTorr, the RF power 1000 Watts was maintained for 90 seconds.

Backfill/Coating

The release coated template film was die coated on a roll to roll processing line at a line speed of 5 Ft/min and a coating width of 4 inches and a flow rate of 5.8 cc/min with a 70% solids solution of SA-250P (Nagase & CO., LTD, Tokyo, Japan) in MEK. The sample was dried by passing over two five foot heated plates at 200 F and cured with a Fusion H bulb under a nitrogen atmosphere.

Adhesive Coating

The Backfilled template film was notch-bar coated with a 2 mil gap with silicone adhesive (an adhesive composition was prepared using the same proportions and same MQ resin as described in Example 1 of U.S. Pat. No. 7,947,376 but using the polymer solution described in U.S. Pat. No. 8,765,881 Example 12.) mixed with 10% w/w of fume titana (AEROXIDE $TiO_2$ NKT 90, available from Evonik Industries, Parsippany, N.J.) to create a bulk diffuser layer. The coating solution was 30% solids in ethyl acetate solution. The solution was dried at 50° C. for 5 min on a hot plate and then hand laminated to a release liner M117 (SILICONATURE USA, LLC, Chicago, Ill.). This formed the Lamination Transfer Film with Daylight Redirecting Optics containing a Bulk Diffuser.

Daylight Redirecting Optics Containing a Bulk Diffuser on Glass

Polished glass slides, 50 mm×50 mm, were first cleaned with a lint free cloth, then sonicated in a wash chamber for 20 minutes with detergent, then 20 minutes in each of two cascading rinse chambers with heated water. The slides were then dried for 20 minutes in an oven with circulating air. The release liner on the Lamination Transfer Film with Daylight Redirecting Optics from above was stripped by hand. This film was laminated, adhesive side down, to the glass slide with a roller. The template film was peeled off and removed, leaving Daylight Redirecting Optics containing a Bulk Diffuser on Glass.

Example 1

Lamination Transfer Film with Daylight Redirecting Optics Containing an Embedded Microstructured Diffuser Template/Release Coating The base film was a 2-mil PET, primed with a UV cured primer comprising 50/50 blend of UVACURE 1500 (available from Allnex, Smyrna, Ga.) and LAROMER TMPTA (available from BASF Corp., Wyandotte, Mich.) with 1% OMAN 071 photoinitiator (available from Gelest Inc., Philadelphia, Pa.). The replicating resin was a 75/25 blend of PHOTOMER 6210 (available from IGM Resins, Charlotte, N.C.) and hexanediol diacrylate with a photoinitator package comprising of 0.5% LUCRIN TPO (available from BASF Corp., Wyandotte, Mich.). Replication of the resin was conducted at 30 fpm on a tool heated to 125 deg F. The tool having the same shape as the desired daylight redirecting structure was fabricated using a diamond-turning process. The desired periodic structure comprised two peaks and four facets per period with one facet per side of the function as shown in FIG. 11. The peaks were rounded slightly as a result of the diamond-turning process.

Radiation from a Fusion "D" lamp operating at 600 W/in was transmitted through the film to cure the resin while in contact with the tool. The composite film was removed from the tool and the patterned side of the film was post UV cured using a Fusion "D" lamp operating at 360 W/in while in contact with a roll heated to 100 deg F.

The replicated template film was placed in a chamber and the surface primed with oxygen gas at a flow rate of standard cc 200/min (SCCM), a pressure of 200 mTorr and RF power of 500 Watts for 30 seconds. Subsequently, the samples were exposed to octafluoropropane ($C_3F_8$) plasma at a flow rate of 250 SCCM but no added oxygen. The pressure in the chamber was 6 mTorr, the RF power 1000 Watts was maintained for 90 seconds.

Backfill/Coating

Figure 9:
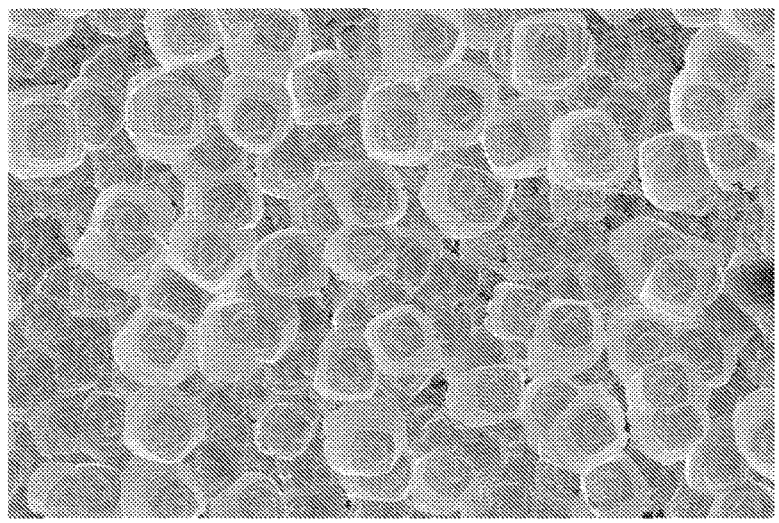
FIG. 9 is a scanning electron micrograph of a top plan view of a microstructured surface.
Figure 10:
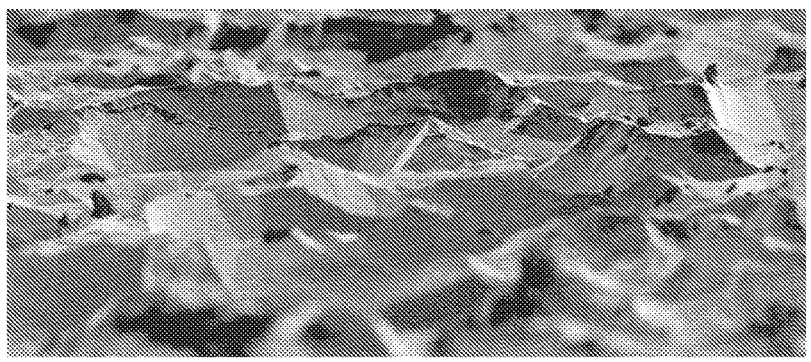
FIG. 10 is a scanning electron micrograph of a perspective view of a microstructured surface.

The release coated template film was die coated on a roll to roll processing line at a line speed of 10 Ft/min and a coating width of 8 inches and a flow rate of 20 cc/min with a 70% solution of SA 250P (Nagase & CO., LTD, Tokyo, Japan) in MEK. The sample was dried by passing over two five foot heated plates at 200 F. A microstructured diffusing (second) template film produced using a tool as described in WO 2014/081693 was release treated in the same method as the template film. The release treated template film was laminated to the uncured backfill coating after drying but before the backfill coating was cured with an Fusion H bulb under a nitrogen atmosphere. The microstructured diffusing (second) template film was removed. The resulting microstructured diffusing structure is depicted in FIGS. 9 and 10.

Adhesive Coating

The microstructured diffusing structure of the backfilled template film was notch-bar coated with a 2 mil gap with a silicone adhesive (an adhesive composition was prepared using the same proportions and same MQ resin as described in Example 1 of U.S. Pat. No. 7,947,376 but using the polymer solution described in U.S. Pat. No. 8,765,881 Example 12.) 30% solids a in ethyl acetate solution. The solution was dried at 50° C. for 5 min on a hot plate, and then hand laminated to a release liner M117 (SILICONATURE USA, LLC, Chicago, Ill.). This formed the Lamination Transfer Film with Daylight Redirecting Optics.

Daylight Redirecting Optics Containing an Embedded Diffuser on Glass

Polished glass slides, 50 mm×50 mm, were first cleaned with a lint free cloth, then sonicated in a wash chamber for 20 minutes with detergent, then 20 minutes in each of two cascading rinse chambers with heated water. The slides were then dried for 20 minutes in an oven with circulating air. The release liner on the Lamination Transfer Film with Daylight Redirecting Optics from above was stripped by hand. This film was laminated, adhesive side down, to the glass slide with a roller. The template film was peeled off and removed, leaving Daylight Redirecting Optics containing an Embedded Diffuser on Glass.

Light Redirection Measurements

Measurements of the ability of the film constructions to redirect light can be determined by laboratory testing utilizing a test that involves shining a beam of light with a controlled intensity onto the film construction and measuring the amount of light that is redirected upwards. The input beam of light may be set at a given angle (e.g. input angle) or may be varied over a range of angles. The amount of light redirected upwards can be measured, for example, with a photodetector. This type of measurement is commonly referred to as bi-directional transmission distribution function (BTDF). An instrument available from Radiant Imaging, WA, under trade name IMAGING SPHERE may be used to perform such measurements.

| | Comparative 1 - Bare daylight redirecting structure on glass | Comparative 2 - Daylight redirecting structure with embedded bulk diffuser on glass | Example 1 - Daylight redirecting structure with embedded surface diffuser on glass |
|---|---|---|---|
| Solar column present | Yes | Yes | No |
| Glare (from light going downwards) | No/Low | Yes/High | No/Low |
| Total forward transmission for an input angle of 45° | 84% | 71% | 94% |
| Daylight redirecting property - Percent incident light redirected upwards for an input angle of 45° | 62% | 42% | 69% |

Example 2

Circle Patterned Daylight Redirecting Optics Containing an Embedded Diffuser on Glass The Lamination Transfer Film with Daylight Redirecting Optics of Example 1 was patterned and then transferred to glass to form Patterned Redirecting Optics containing an Embedded Diffuser on Glass. Circle patterns were score cut using a laser system (ILS9.75 available from Universal Laser Systems, Scottsdale, Ariz.), through the template film, the redirecting optics, and the adhesive layers. The adhesive liner was left intact to maintain relative orientation and location of cut circles. The weed was manually removed from around the circular patterns. A polyester tape, #8403 available from 3M Company, St. Paul, Minn., was applied over the remaining template film surface (circles on the liner). The adhesive liner was removed, exposing the adhesive. The polyester tape containing the circles of Daylight Redirecting Structures containing an Embedded Diffuser was laminated onto a glass substrate (prepared as described above) and peeled off, removing the template film from the redirecting optics in the process. The Circle Patterned Daylight Redirecting Optics containing an Embedded Diffuser on Glass remained.

Example 3

Daylight Redirecting Glazing Element Containing Embedded Diffuser Through Lamination of Transfer Film with Daylight Redirecting Optics on to Roughened Glass Surface Template/Release Coating The base film was a 2-mil PET, primed with a UV cured primer comprising 50/50 blend of UVACURE 1500 (available from Allnex, Smyrna, Ga.) and LAROMER TMPTA (available from BASF Corp., Wyandotte, Mich.) with 1% OMAN 071 photoinitiator (available from Gelest Inc., Philadelphia, Pa.). The replicating resin was a 75/25 blend of PHOTOMER 6210 (available from IGM Resins, Charlotte, N.C.) and hexanediol diacrylate with a photoinitiator package comprising of 0.5% LUCRIN TPO (available from BASF Corp., Wyandotte, Mich.). Replication of the resin was conducted at 30 fpm on a tool heated to 125° F. The tool having the same shape as the desired daylight redirecting structure was fabricated using a diamond-turning process. The desired periodic structure comprised two peaks and four facets per period with one facet per side of the function as shown in FIG. 11. The peaks were rounded slightly as a result of the diamond-turning process.

Radiation from a Fusion "D" lamp operating at 600 W/in was transmitted through the film to cure the resin while in contact with the tool. The composite film was removed from the tool and the patterned side of the film was post UV cured using a Fusion "D" lamp operating at 360 W/in while in contact with a roll heated to 100 deg F.

The replicated template film was placed in a chamber and the surface primed with oxygen gas at a flow rate of standard cc 200/min (SCCM), a pressure of 200 mTorr and RF power of 500 Watts for 30 seconds. Subsequently, the samples were exposed to octafluoropropane ($C_3F_8$) plasma at a flow rate of 250 SCCM but no added oxygen. The pressure in the chamber was 6 mTorr, the RF power 1000 Watts was maintained for 90 seconds.

Backfill/Coating

The release coated template film was die coated on a roll to roll processing line at a line speed of 5 Ft/min and a coating width of 4 inches and a flow rate of 5.8 cc/min with a 70% solids solution of SA-250P (Nagase & CO., LTD, Tokyo, Japan) in MEK. The sample was dried by passing over two five foot heated plates at 200 F and cured with a Fusion H bulb under a nitrogen atmosphere.

Adhesive Coating

The backfilled template film was notch-bar coated with a 2 mil gap with a silicone adhesive (an adhesive composition was prepared using the same proportions and same MQ resin as described in Example 1 of U.S. Pat. No. 7,947,376 but using the polymer solution described in U.S. Pat. No. 8,765,881 Example 12.) 30% solids a in ethyl acetate solution. The solution was dried at 50° C. for 5 min on a hot plate, and then hand laminated to a release liner M117 (SILICONATURE USA, LLC, Chicago, Ill.). This formed the Lamination Transfer Film with Daylight Redirecting Optics.

Daylight Redirecting Optics on Glass

A 5.6 mm thick glass slide was blasted with 50 micron aluminum oxide to roughen the surface of the glass to create a microstructured diffuse surface. The release liner on the Lamination Transfer Film with Daylight Redirecting Optics from above was stripped by hand. This film was laminated, adhesive side down, to the roughened side of the glass slide with a roller. The template film was peeled off and removed, leaving Daylight Redirecting Optics on Glass creating a daylight redirecting glazing element with an embedded diffusive interface.

Example 4

Daylight Redirecting Glazing Element with Integral Diffuser Made by a Roughened Glass Surface Opposite the Daylight Redirecting Optical Laminate Template/Release Coating The base film was a 2-mil PET, primed with a UV cured primer comprising 50/50 blend of UVACURE 1500 (available from Allnex, Smyrna, Ga.) and LAROMER TMPTA (available from BASF Corp., Wyandotte, Mich.) with 1% OMAN 071 photoinitiator (available from Gelest Inc., Philadelphia, Pa.). The replicating resin was a 75/25 blend of PHOTOMER 6210 (available from IGM Resins, Charlotte, N.C.) and hexanediol diacrylate with a photoinitiator package comprising of 0.5% LUCRIN TPO (available from BASF Corp., Wyandotte, Mich.). Replication of the resin was conducted at 30 fpm on a tool heated to 125° F. The tool having the same shape as the desired daylight redirecting structure was fabricated using a diamond-turning process. The desired periodic structure comprised two peaks and four facets per period with one facet per side of the function as shown in FIG. 11. The peaks were rounded slightly as a result of the diamond-turning process.

Radiation from a Fusion "D" lamp operating at 600 W/in was transmitted through the film to cure the resin while in contact with the tool. The composite film was removed from the tool and the patterned side of the film was post UV cured using a Fusion "D" lamp operating at 360 W/in while in contact with a roll heated to 100 deg F.

The replicated template film was placed in a chamber and the surface primed with oxygen gas at a flow rate of standard cc 200/min (SCCM), a pressure of 200 mTorr and RF power of 500 Watts for 30 seconds. Subsequently, the samples were exposed to octafluoropropane ($C_3F_8$) plasma at a flow rate of 250 SCCM but no added oxygen. The pressure in the chamber was 6 mTorr, the RF power 1000 Watts was maintained for 90 seconds.

Backfill/Coating

The release coated template film was die coated on a roll to roll processing line at a line speed of 5 Ft/min and a coating width of 4 inches and a flow rate of 5.8 cc/min with a 70% solids solution of SA-250P (Nagase & CO., LTD, Tokyo, Japan) in MEK. The sample was dried by passing over two five foot heated plates at 200 F and cured with a Fusion H bulb under a nitrogen atmosphere.

Adhesive Coating

The backfilled template film was notch-bar coated with a 2 mil gap with a silicone adhesive (an adhesive composition was prepared using the same proportions and same MQ resin as described in Example 1 of U.S. Pat. No. 7,947,376 but using the polymer solution described in U.S. Pat. No. 8,765,881 Example 12.) 30% solids a in ethyl acetate solution. The solution was dried at 50° C. for 5 min on a hot plate, and then hand laminated to a release liner M117 (SILICONATURE USA, LLC, Chicago, Ill.). This formed the Lamination Transfer Film with Daylight Redirecting Optics.

Daylight Redirecting Optics on Glass

A 5.6 mm thick glass slide was blasted with 50 micron aluminum oxide to roughen the surface of the glass to create a microstructured diffuse surface. The release liner on the Lamination Transfer Film with Daylight Redirecting Optics from above was stripped by hand. This film was laminated, adhesive side down, to the planar, smooth side of the glass slide with a roller. The template film was peeled off and removed, leaving Daylight Redirecting Optics on Glass creating a daylight redirecting glazing element with an exposed diffusive interface.

What is claimed is:

1. A transfer tape, comprising:
   a removable template layer having a structured surface;
   a backfill layer having a first surface disposed on at least a portion of the structured surface of the template layer, and a second surface opposite the structured surface wherein the second surface comprises a microstructured surface;
   a layer disposed on at least a portion of the microstructured surface wherein the layer has a refractive index that differs from the backfill layer.

2. The transfer tape of claim 1 wherein the microstructured surface together with the layer disposed on at least a portion of the microstructured surface is a diffusive layer.

3. The transfer tape of claim 1 wherein the layer comprises an adhesive.

4. The transfer tape of claim 3 wherein the adhesive comprises a polydiorganosiloxane polyoxamide copolymer.

5. The transfer tape of claim 3 wherein the adhesive layer is disposed in a pattern on the microstructured surface of the backfill layer.

6. The transfer tape of claim 1 wherein the backfill layer has a refractive index greater than the adhesive layer.

7. The transfer tape of claim 1, wherein the backfill material comprise a polysiloxane material.

8. The transfer tape of claim 1 further comprising a carrier film disposed on a planar surface of the template layer opposite the structured surface.

9. The transfer tape of claim 1 further comprising a transfer layer disposed between the structured surface of the template layer and the backfill layer.

10. The transfer tape of claim 9 wherein the transfer layer comprises a release coating.

11. The transfer tape of claim 1 wherein the structured surface comprises a microoptical refractive surface.

12. The transfer tape of claim 1 wherein the structured surface comprises surface features greater than about 10 microns in height.

13. The transfer tape of claim 1 wherein the backfill layer is disposed in a pattern on the structured surface of the template layer.

14. The transfer tape of claim 13 wherein the pattern comprises a plurality of islands, lines, or a combination of islands and lines.

15. A microoptical glazing comprising:
    a pane of glass having a major surface;
    a microoptical layer bonded to at least a portion of the major surface, the microoptical layer comprising a cured backfill layer wherein the microoptical layer has a structured surface and opposing microstructured surface, and a layer adjacent the microstructured surface having a refractive index that differs from the backfill layer.

16. The microoptical glazing of claim 15 wherein the layer adjacent the microstructured surface is an adhesive and the adhesive bonds the microoptical layer to the major surface of the pane of glass.

17. The microoptical glazing of claim 15 wherein there is no organic polymeric film substrate between the microoptical layer and the pane of glass.

18. A microoptical glazing comprising:
    a pane of glass having a major surface;
    a microoptical layer bonded to at least a portion of the major surface, and
    a microstructured interface adjacent a layer having a different refractive index;
    wherein for an input angle ranging from 30° to 60° the microoptical glazing redirects upwards at least 80% of daylight and does not exhibit a solar column.

19. The insulating glass unit of claim 18 wherein the structured surface is adjacent a gas filling the gap, such that sunlight passing through the outside surface is refracted by the structured surface before passing through the inside surface.

20. An insulated glazing unit, comprising:
    a pane of glass having a sun-facing pane exterior surface separated by a gap from a pane of glass having a room-facing exterior surface, each pane having an interior surface adjacent the gap; and
    a microoptical layer bonded to at least a portion of an interior surface of a pane of glass, the microoptical layer comprising a cured backfill layer, wherein the microoptical layer has a structured surface and an opposing microstructured surface adjacent a layer having a refractive index that differs from the backfill layer.

21. The insulated glazing unit of claim 20 wherein the layer adjacent the microstructured surface is an adhesive and the adhesive bonds the microoptical layer to the major surface of the pane of glass.

22. An insulated glazing unit, comprising
a pane of glass having a sun-facing pane exterior surface separated by a gap from a pane of glass having a room-facing exterior surface, each pane having an interior surface adjacent the gap; and
a microoptical layer disposed on an interior surface of the insulated glazing unit; and
a microstructured interface disposed between the microoptical layer and the room-facing exterior surface.

23. The insulated glass unit of claim 22 wherein the microoptical layer has a structured surface and an opposing planar surface wherein the planar surface is bonded to a microstructured interface of an interior sun-facing surface of the pane of glass with an adhesive.

24. The insulated glass unit of claim 22 wherein the microoptical layer has a structured surface and an opposing planar surface and the microstructured interface is disposed on the exterior room-facing surface of the pane of glass.

25. The microoptical glazing of claim 22 wherein there is no organic polymeric film substrate between the microoptical layer and the pane of glass.

* * * * *

UNITED STATES PATENT AND TRADEMARK OFFICE
CERTIFICATE OF CORRECTION

| | |
|---|---|
| PATENT NO. | : 9,970,614 B2 |
| APPLICATION NO. | : 15/519945 |
| DATED | : May 15, 2018 |
| INVENTOR(S) | : Justin Meyer |

Page 1 of 2

It is certified that error appears in the above-identified patent and that said Letters Patent is hereby corrected as shown below:

On the Title Page

Column 1 (Notice)
Line 3, After "0 days." Delete "days.".

In the Specification

Column 2
Line 43, Delete "FIG." and insert -- FIGS. --, therefor.

Column 5
Line 25-28, Delete "The structured surface 224 and planar regions 226 are adjacent a low index material (e.g. air) having an index of refraction lower than the cured backfill layer 220." and insert the same in Column 5, Line 29, before "The pattern formed" as a continuation of the paragraph.

Column 6
Line 24, Delete "FIG." and insert -- FIGS. --, therefor.

Column 6
Line 32, Delete "FIG." and insert -- FIGS. --, therefor.

Column 10
Line 14, Delete "plain" and insert -- plan --, therefor.

Column 10
Line 21, Delete "plain" and insert -- plan --, therefor.

Signed and Sealed this
Sixteenth Day of April, 2019

Andrei Iancu
*Director of the United States Patent and Trademark Office*

Column 13
Line 21, Delete "(vinychloride);" and insert -- (vinylchloride); --, therefor.

Column 13
Line 35, Delete "polyolefms" and insert -- polyolefins --, therefor.

Column 14
Line 13, Delete "syndiodactic" and insert -- syndiotactic --, therefor.

Column 15
Line 20 (approx.), Delete "syndiodactic" and insert -- syndiotactic --, therefor.

Column 19
Line 54, After "Cl" insert -- , --.

Column 19
Line 57, Delete "hydrazine" and insert -- hydrazino --, therefor.

In the Claims

Column 32
Line 56, In Claim 19, Delete "glass" and insert -- glazing --, therefor.

Column 32
Line 58, In Claim 19, Delete "outside" and insert -- sun-facing pane exterior --, therefor.

Column 32
Line 59, In Claim 19, Delete "inside" and insert -- room-facing exterior --, therefor.

Column 33
Line 19, In Claim 23, Delete "glass" and insert -- glazing --, therefor.

Column 33
Line 24, In Claim 24, Delete "glass" and insert -- glazing --, therefor.

Column 33
Line 28, In Claim 25, Delete "microoptical glazing" and insert -- insulated glazing unit --, therefor.